United States Patent
Huang

(10) Patent No.: US 12,452,324 B2
(45) Date of Patent: Oct. 21, 2025

(54) DATA PROCESSING METHOD AND APPARATUS, ELECTRONIC DEVICE, STORAGE MEDIUM, AND PROGRAM PRODUCT

(71) Applicant: TENCENT TECHNOLOGY (SHENZHEN) COMPANY LIMITED, Shenzhen (CN)

(72) Inventor: Liuwen Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 5 days.

(21) Appl. No.: 18/654,948

(22) Filed: May 3, 2024

(65) Prior Publication Data
US 2024/0291877 A1    Aug. 29, 2024

Related U.S. Application Data

(63) Continuation of application No. PCT/CN2023/111133, filed on Aug. 4, 2023.

(30) Foreign Application Priority Data

Sep. 20, 2022   (CN) .......................... 202211146126.0

(51) Int. Cl.
*H04L 65/403*    (2022.01)
*H04L 65/60*     (2022.01)
(Continued)

(52) U.S. Cl.
CPC ............ *H04L 65/403* (2013.01); *H04L 65/60* (2013.01); *H04N 7/15* (2013.01); *H04N 21/2187* (2013.01); *H04N 21/431* (2013.01)

(58) Field of Classification Search
CPC ......... H04L 65/403; H04L 65/60; H04N 7/15; H04N 21/2187; H04N 21/431; H04N 21/4788
(Continued)

(56) References Cited

U.S. PATENT DOCUMENTS

2013/0322687 A1* 12/2013 Kritt ...................... H04N 7/181
382/103

FOREIGN PATENT DOCUMENTS

| CN | 107124662 A | 9/2017 |
| CN | 112887653 A | 6/2021 |

(Continued)

OTHER PUBLICATIONS

The World Intellectual Property Organization (Wipo) International Search Report for PCT/CN2023/111133 Nov. 22, 2023 5 Pages (including translation).

*Primary Examiner* — Adil Ocak
(74) *Attorney, Agent, or Firm* — Anova Law Group, PLLC

(57) ABSTRACT

Embodiments of this application provide a data processing method includes obtaining relevant information of a first object corresponding to a target application program and relevant information of second objects in a candidate object set, and the first object and the second objects corresponding to a same streaming media identifier; determining, according to the relevant information of the first object and the relevant information of the second objects, display attribute information corresponding to the second objects; generating a target data stream according to the display attribute information corresponding to the second objects, the target data stream comprising a media stream of at least one target object; and transmitting the target data stream to a target
(Continued)

terminal corresponding to the first object, to enable the target terminal to display a media stream in the target data stream.

20 Claims, 8 Drawing Sheets

(51) Int. Cl.
*H04N 7/15* (2006.01)
*H04N 21/2187* (2011.01)
*H04N 21/431* (2011.01)

(58) Field of Classification Search
USPC .......................................................... 709/204
See application file for complete search history.

(56) References Cited

FOREIGN PATENT DOCUMENTS

| | | |
|---|---|---|
| CN | 114331495 A | 4/2022 |
| CN | 117640763 A | 3/2024 |
| WO | 2021143255 A1 | 7/2021 |
| WO | 2021217385 A1 | 11/2021 |
| WO | 2024037161 A1 | 2/2024 |

* cited by examiner

DATA PROCESSING METHOD AND APPARATUS, ELECTRONIC DEVICE, STORAGE MEDIUM, AND PROGRAM PRODUCT

RELATED APPLICATIONS

This application is a continuation application of PCT Application No. PCT/CN2023/111133, filed on Aug. 4, 2023, which in turn claims priority to Chinese Patent Application No. 202211146126.0, filed with the China National Intellectual Property Administration on Sep. 20, 2022, and entitled "DATA PROCESSING METHOD AND APPARATUS, ELECTRONIC DEVICE, AND STORAGE MEDIUM." The two applications are incorporated by reference in their entirety.

FIELD OF THE TECHNOLOGY

This application relates to the field of multimedia and cloud technologies, and in particular, to data processing.

BACKGROUND OF THE DISCLOSURE

With rapid development of science and technology and continuous improvement of people's standard of living, application programs providing various services have become an indispensable part of daily lives. Various real-time communication technologies having interactive functions can provide various online functions for people, such as online livestreaming, online classes, online conferences, group livestreaming, multi-players online games, and video sharing.

In an online interaction scenario in which a plurality of persons (at least two persons) participate, there are usually livestreamers and viewers. Some users may be both the livestreamers and the viewers. For example, in a multi-person video conference scenario, each of conference participants may be both a livestreamer and a viewer. Although existing real-time communication technologies have brought great convenience to daily lives and can satisfy basic requirements, currently, in a multi-person interaction scenario, for both viewers and livestreamers, media data displayed to all viewers or all livestreamers is undifferentiated. This may have an impact on the user experience of a user, and in particular, may have a severe impact on the effect of interactions of a user when there are a large number of users participating in the interactions.

SUMMARY

Embodiments of this application are intended to provide a data processing method and apparatus, an electronic device, and a storage medium, to better satisfy requirements in specific application and effectively improve an interaction effect. To achieve the foregoing objectives, embodiments of this application provide the following technical solutions.

One aspect of this application provides a data processing method, including: obtaining relevant information of a first object corresponding to a target application program and relevant information of second objects in a candidate object set, the relevant information comprising at least one of position information or object attribute information, and the first object and the second objects corresponding to a same streaming media identifier; determining, according to the relevant information of the first object and the relevant information of the second objects, display attribute information corresponding to the second objects, the display attribute information corresponding to one of the second objects being configured for identifying a display attribute of a media stream of the second object corresponding to the first object; generating a target data stream according to the display attribute information corresponding to the second objects, the target data stream comprising a media stream of at least one target object, and the at least one target object being a second object determined from the second objects; and transmitting the target data stream to a target terminal corresponding to the first object, to enable the target terminal to display a media stream in the target data stream.

According to another aspect, an embodiment of this application further provides a data processing method, including displaying, in response to a media data obtaining trigger operation of a first object corresponding to a target application program, a media stream of at least one target object in second objects in a candidate object set to the first object, the second objects having corresponding display attribute information, the at least one target object being a second object determined from the second objects, the media stream of the at least one target object matching display attribute information corresponding to the at least one target object, the display attribute information corresponding to one of the second objects being configured for identifying a display attribute of a media stream of the second object corresponding to the first object, the display attribute information matching relevant information of the first object and relevant information of the second object, the relevant information comprising at least one of position information and object attribute information, and the first object and the second objects being objects corresponding to a same streaming media identifier of the target application program.

According to another aspect, an embodiment of this application further provides an electronic device, including a memory and a processor, the memory having a computer program stored therein, and the processor executing the computer program to implement the method according to any some embodiments.

According to another aspect, an embodiment of this application further provides a non-transitory computer-readable storage medium, having a computer program stored thereon, the computer program, when executed by a processor, implementing the method according to any optional embodiment of this application.

The data processing method according to embodiments of this application may be applied to any multi-person online interaction scenario. For objects corresponding to the same streaming media identifier (for example, an identifier of the same virtual room), instead of directly providing all media streams corresponding to second objects to each first object without any differentiation, display attribute information of the media streams of the second objects relative to the first object is determined according to relevant information of the first object and the second objects, so that according to the display attribute information corresponding to the media streams of the second objects, a target data stream matching the first object may be generated and provided to the first object. Relevant information of different first objects is usually different, and based on the method according to embodiments of this application, corresponding media data can be provided to objects according to suitable methods for the objects. Therefore, more flexible and personalized recommendation can be delivered, so that use experience of a user can be improved to better satisfy specific application requirements.

DESCRIPTION OF EMBODIMENTS

Figure 1:
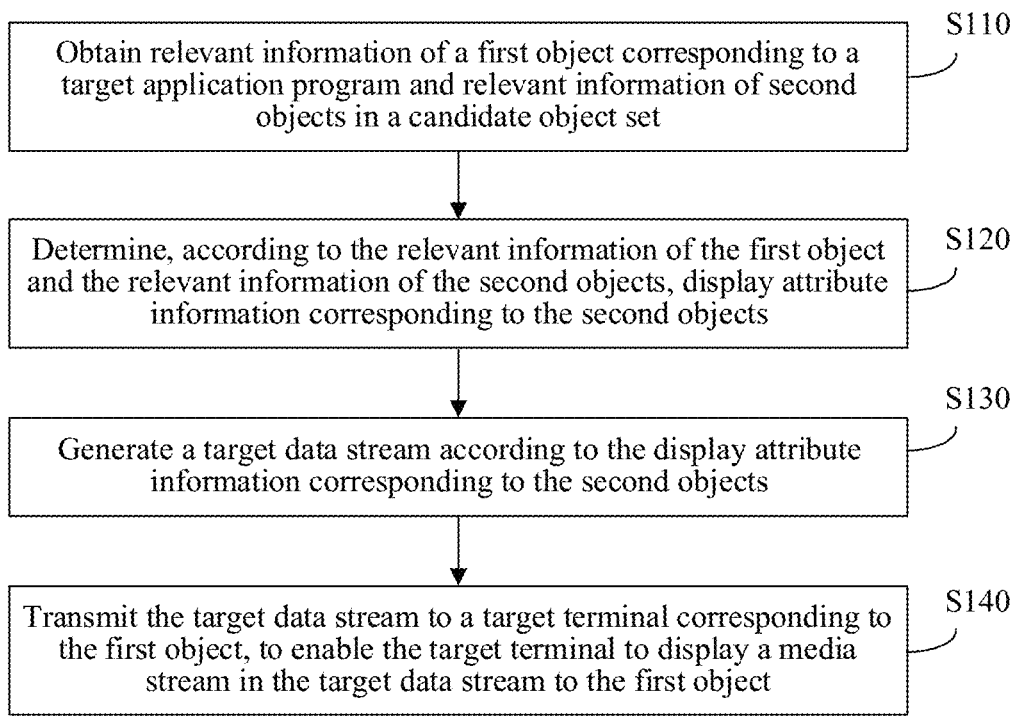
FIG. 1 is a schematic flowchart of a data processing method according to an embodiment of this application.

The following describes embodiments of this application with reference to the accompanying drawings of this application. The implementations described below with reference to the accompanying drawings are exemplary descriptions for explaining the technical solutions of embodiments of this application, and do not constitute any limitation on the technical solutions of embodiments of this application.

A person skilled in the art may understand that unless specifically stated, the singular forms "a", "one", "said", and "the" as used herein may also include the plural form. The terms "comprise" and "include" used in embodiments of this application refer to corresponding features that can be realized as presented features, information, data, steps, operations, elements, and/or assemblies, but does not exclude the implementation of other features, information, data, steps, operations, elements, assemblies, and/or combinations thereof supported in the art. One element is referred to as "connected" or "coupled" to another element, the element may be directly connected or coupled to another element, or may refer to a connection relationship established between the element and another element through an intermediate element. In addition, the "connection" or "coupling" used herein may include wireless connection or wireless coupling. The term "and/or" used herein indicates at least one of the items defined by the term. For example, "A and/or B" indicates an implementation as "A", an implementation as "A", or an implementation as "A and B". When describing a plurality of (two or more) items, if the relationship between the plurality of items is not explicitly defined, the plurality of items may refer to one, more than one, or all of the plurality of items. For example, the description of "a parameter A includes A1, A2, and A3" may be implemented as that a parameter A includes A1, A2, or A3, or may be implemented as that a parameter A includes at least two of three parameters A1, A2, and A3.

An embodiment of this application provides a data processing method to better improve a use feeling of a user in multi-person online interaction application. The method may be applied to, but not limited to, a real-time communication scenario. Real-time communication (RTC) is a provided audio and video communication service with low delay and high quality, and can provide a user with an audio and video transmission capability that is stable, reliable, and cost-effective. An audio and video application, for example, a video call, online education, online livestreaming, and an online conference can be quickly established by using the service. In this case, how to better improve use experience of an online user has always been an important issue in the study of relevant technicians. In the method according to embodiments of this application, an effect of improving the experience of a user can be achieved from one or more dimensions.

In some embodiments, data processing in the method according to some embodiments may be implemented based on a cloud technology. In some embodiments, data in some embodiments may be stored by using a cloud storage method, and a related data computing operation may be implemented by using a cloud computing technology.

Cloud computing is a computing mode, in which computing tasks are distributed on a resource pool formed by a large number of computers, so that various application systems can obtain computing power, storage space, and information services according to requirements. A network that provides resources is referred to as a "cloud". For a user, resources in a "cloud" seem to be infinitely expandable, and can be obtained readily, used on demand, expanded readily, and paid for according to usage. Cloud storage is a new concept extended and developed on the concept of the cloud computing. A distributed cloud storage system (a storage system for short below) refers to a storage system integrating a large number of different types of storage devices (also referred to as storage nodes) in a network to collaborate via application software or application interfaces by using a function such as a cluster application, a grid technology, and a distributed storage file system and jointly provide data storage and service access functions to the outside.

In some embodiments, the method according to some embodiments may be applied to a cloud conference scenario. A cloud conference is an efficient, convenient, and cost-effective conference form based on the cloud computing technology. A user only needs to perform a simple operation on an Internet interface to quickly and efficiently share a speech, a data file, and a video with teams and customers all over the world synchronously. A cloud conference service provider helps the user to operate complex technologies such as data transmission and processing in the conference. Currently, domestic cloud conferences mainly focus on service content mainly in the mode of software as a service (SaaS), including a service form such as a telephone, a network, and a video. A video conference based on cloud computing is called a cloud conference.

In some embodiments, the method according to some embodiments may be applied to cloud computing education (CCEDU). The cloud computing education refers to an education platform service applied based on a cloud computing business mode. On a cloud platform, all of educational institutions, training institutions, admissions service institutions, propaganda organizations, industry associations, management organizations, industry media, legal structures, and the like are centralized and integrated in a cloud as a resource pool. All resources are mutually displayed and interacted and communicated according to requirement to achieve intentions, so that education costs are reduced and efficiency is improved.

The method according to some embodiments may also be applied to multi-person online interaction application without using the cloud technology.

The following describes the technical solutions of embodiments of this application and technical effects achieved by the technical solutions of this application by describing several exemplary implementations. The following implementations may be referred to or combined with each other, and the descriptions of the same terms, similar features, and similar implementation steps in different implementations are not be repeated again.

FIG. 1 is a schematic flowchart of a data processing method according to an embodiment of this application. The method may be performed by a server. The server may be an independent physical server, a server cluster or a distributed system formed by a plurality of physical servers, or a cloud server providing cloud computing services. The server may receive a media stream uploaded by a terminal, and further transmit the received media stream to a corresponding receiving terminal. The terminal (also referred to as a user terminal/user equipment/terminal device) may be a smartphone, a tablet computer, a notebook computer, a desktop computer, a smart voice interaction device (such as a smart speaker), a wearable electronic device (such as a smartwatch), a vehicle-mounted terminal, a smart home appliance (such as a smart television), an AR/VR device, or the like, but is not limited thereto. The terminal may be directly or indirectly connected to the server via wired or wireless communications, which is not limited in this application.

In some embodiments, the server may be an application server in a target application program. The application server may provide multimedia data services for a user of the target application program. A user terminal running the target application program may be a stream pushing end or a stream pulling end. The stream pushing end may push livestreaming content of the media stream (for example, an audio stream, a video stream, or the like of livestreaming content and an online conference) to the server, and the stream pulling end may obtain the media stream from the server.

In some embodiments, the method according to some embodiments may be performed by the user terminal. The server may transmit media streams of second objects to a user terminal of a first object. The user terminal of the first object may display the received media streams to the first object by performing the method according to some embodiments.

As shown in FIG. 1, the data processing method according to some embodiments may include the following S110 to S140:

S110: Obtain relevant information of a first object corresponding to the target application program and relevant information of second objects in a candidate object set.

In some embodiments, the target application program may be an application program providing a media stream service to a user, for example, an application providing an online conference service, an application providing an online education function, or the like.

The media stream may be a media stream in any form such as an audio stream, a video stream, or a multimedia file stream. A streaming media identifier may be configured for uniquely identifying a streaming media. For example, the streaming media identifier may be an identifier (a room number) of a specific livestreaming room in a livestreaming scenario, a game match identifier in a game scenario (in which case, players in the same game match may be understood as objects corresponding to the same streaming media identifier), a conference number (for example, a conference ID) of a specific conference in an online conference scenario, a multi-person group identifier in a multi-person audio and video call scenario, or the like. In examples of the foregoing application scenarios, a virtual livestreaming room in the livestreaming scenario, a virtual conference room in the online conference scenario (in which each conference ID corresponds to a virtual conference room), a group in the multi-person call scenario, a virtual game environment of the same game match in the game scenario, and the like may be understood as a virtual environment corresponding to the application program. According to the streaming media identifier, the server may determine which objects correspond to objects in the current same virtual environment. For ease of description, in some embodiments below, the streaming media identifier is described by using a virtual room identifier as an example.

In some embodiments, the first object and the second objects are objects corresponding to a same streaming media identifier. In other words, the first object and the second objects are object corresponding to the same room (a virtual room). The first object may be any stream pulling end user in the room, and the second objects may be all or some stream pushing end users in the room. In other words, the second objects are users that transmit the media stream to the server, and the first object is a user that receives the media stream transmitted by the server. For example, in a livestreaming scenario, a first object and each second object may be a viewer and a livestreamer in the same livestreaming room respectively. In some embodiments, in some livestreaming scenarios, interaction (for example, voice interaction) may alternatively be performed between viewers or between a viewer and a livestreamer. In such scenarios, both the viewer and the livestreamer may be used as the second object. Only a livestreamer may alternatively be used as a second object. In some scenarios, an object may be both a stream pulling end user and a stream pushing end user. For example, in a multi-person conference scenario, a user participating in the conference may be both a livestreamer and a viewer. For another example, in a game scenario, all players currently in a round of the game are both viewers and livestreamers. In some embodiments below, the first object is replaced with a user or a viewer and the second object is replaced with a livestreamer for description.

For any object, the foregoing relevant information may include at least one of position information or object attribute information. The position information of the object may be at least one of real position information of the object or virtual position information corresponding to the object in a virtual scene of the target application program.

In other words, the position information may be position information of a real environment/space or position information corresponding to the object in a virtual environment of the target application program. For example, in a game scenario, virtual position information of an object may be position information of a player character of a user in a game environment. For another example, in a multi-person online conference scenario, position information of an object may be position information of an object in a virtual conference room. For another example, in an online education scenario, a target application program may present a picture of a virtual classroom in which a plurality of virtual seats is included. Students (objects) engaging in the online class may select one of the virtual seats to join the online class. Positions (for example, positions corresponding to the virtual seats) of the students in the virtual class may be used as position information of the students.

In some embodiments, the position information may include coordinates and an orientation of the object, for example, specific geographical coordinates and an specific orientation of the object, or may be virtual coordinates and a virtual orientation, for example, virtual coordinates and a virtual orientation in Metaverse, coordinates and an orientation in a virtual conference room, coordinates and an orientation in a virtual class, and coordinates and an orientation in a virtual game map. The coordinates may be two-dimensional coordinates or three-dimensional coordinates.

The method for obtaining the position information of the object is not limited to embodiments of this application and may be configured according to specific application requirements. For example, the user terminal may periodically report the position information to the server according to preset intervals under the premise of user authorization. For example, the user terminal may periodically report the position information of the object per second according to a heartbeat signal (in other words, a heartbeat packet). Alternatively, the position information may be reported when position information of the user changes. For example, the position information may be reported when a distance between a current position of the user and a previous position exceeds a set distance. Alternatively, the user terminal may periodically report the position information to an intermediate node according to a preset interval. The intermediate node may determine, according to the position information currently reported by the terminal and position information previously reported by the terminal, to report current position information to the server when position information of the user changes.

The object attribute information of the object may be understood as some attributes that the user has objectively. The object attribute information may be some personalized parameters of the objects, and may include but is not limited to information such as hobbies and interests of the user. In some embodiments, the object attribute information may include all information related to a media data preference of the object, for example, the object likes or dislikes which type of audio, videos, and the like.

In some embodiments, the relevant information of the object is obtained under the premise of object authorization. The method for obtaining the object attribute information is not limited to the embodiments of this application. The object attribute information may be configured by the user by using a client of the target application program, or may be obtained by the server through analyzing historical usage of the target application program by the user.

S120: Determine, according to the relevant information of the first object and the relevant information of the second objects, display attribute information corresponding to the second objects.

The display attribute information corresponding to one of the second objects is configured for identifying a display attribute of a media stream of the second object relative to the first object.

S130: Generate a target data stream according to the display attribute information corresponding to the second objects.

The target data stream includes a media stream of at least one target object, and the at least one target object is a second object determined from the second objects.

S140: Transmit the target data stream to a target terminal corresponding to the first object, to enable the target terminal to display a media stream in the target data stream to the first object.

The media stream of the second object refers to media data pushed to the server by the user terminal of the second object or media data corresponding to the second object obtained by the server, for example, livestreaming content of a livestreamer in a livestreaming scenario, conference video data of participants in a multi-person online conference scenario, or a virtual scene picture of a virtual character corresponding a player in a game scenario or an audio stream or a video picture of a player. In some embodiments, the media stream may include but is not limited to an audio stream, a video stream, another multimedia data stream, or the like.

In some embodiments, for each of the second objects, the display attribute information corresponding to the second object may be determined according to the relevant information of the second object and the relevant information of the first object. The display attribute information refers to display attribute information of the media stream of the second object relative to the first object, that is, information related to display of the media stream of the second object. Attributes specifically included in display attributes of the media stream may be configured according to specific requirements. In some embodiments, the display attribute information may include but is not limited to at least one piece of attribute information such as whether to display and how to display. For example, for the media stream including an audio stream, the display attribute information may include whether to provide a media stream of each second object to the first object, how the audio stream is played to the first object when the media stream is provided to the first object, and the like. For another example, for the media stream including an image (such as a video stream), the display attribute information may be presenting attribute information of the media stream, to be specific, how the media stream of the second object is presented to the first object.

In some embodiments, the display attribute information of the media stream may include at least one of first information or second information. The first information is configured for determining whether to provide a media stream of each second object to the first object, and the second information is configured for determining a display method for displaying a media stream to the first object. In other words, the first information identifies whether the second object is a target object corresponding to the first object. If the second object is the target object, the server may provide the media stream of the second object to the first object. If the second object is not the target object, the media stream of the second object may not be provided to the first object even if the first object and the second objects are objects corresponding to the same room. The second information is configured for determining a method for displaying a media stream to the first object. For example, the media stream may be an audio stream, and the second information may determine how to play the audio stream to the first object. For another example, the media stream is a video stream, and the second information may determine how to display a video picture of the video stream to the first object.

In some embodiments, the target object corresponding to the first object may be all of the second objects or some of the second objects. For example, in a multi-person online video conference scenario, all conference participants in the scenario may be livestreamers. For any conference participant (a first object), all other conference participants may be second objects, and these second objects may be directly used as target objects corresponding to the first object. In this example, the display attribute information may not include the first information, in other words, there may be no need to determine which objects are target objects. The display attribute information may include the second information, and the second information may determine, according to the relevant information of the first object and the second objects, how to display the media streams of the second objects to the first object.

In some embodiments, which second objects are the target objects may be first determined according to the relevant information of the first object and the second objects. The server may only provide media streams of some or all of these target objects to the first object. In this case, the display attribute information includes the first information. The server may determine the target objects from the second objects according to the first information corresponding to the second objects.

In some embodiments, when the target objects are objects selected from the second objects, after the target objects are determined, the server may alternatively determine, according to the relevant information of the first object and relevant information of the target objects, second information corresponding to the target objects (in which case, only the second information corresponding to the target objects may be determined without determining second information corresponding to all of the second objects), so that when the media streams of the target objects is transmitted to the target terminal of the first object, the media streams of the target objects may have respective display methods, and the target terminal may display the media streams to the first object according to the display methods of the media streams of the target objects.

After determining the display attribute information corresponding to the second objects, the server may generate, according to the display attribute information corresponding to the second objects, the target data stream corresponding to the first object, and provide the target data stream to the first object by using the target terminal of the first object. The target data stream includes at least the media streams corresponding to the target objects. After receiving the target data stream, the target terminal of the first object may display the media streams in the data stream to the first object. In some embodiments, the target data stream may alternatively include display method prompt information of the media streams corresponding to the target objects. The target terminal may display, according to the display method prompt information of the media streams of the target objects, the media streams to the first object according to corresponding display method prompt information.

In one embodiment, the method may further include: If a current application scenario corresponding to the target application program satisfies a preset condition, the display attribute information includes the second information and does not include the first information. If the current application scenario does not satisfy a preset condition, the display attribute information includes at least one of the first information or the second information.

In some embodiments, the current application scenario may refer to a program type of the target application program or at least one of a quantity of all of the objects corresponding to the streaming media identifier. For example, if the program type of the target application program is a first type or the quantity of all of the objects corresponding to the streaming media identifier is less than at least one of set values, the display attribute information corresponding to the second objects includes the second information and does not include the first information, otherwise (for example, the program type is not the first type), the display attribute information corresponding to the second objects includes at least one of the first information or the second information.

In other words, when the target application program is a program of a specific type (for example, an online conference), only the display method of the media stream may be determined, and all of the second objects are used as the target objects. Alternatively, when a quantity of the second objects (for example, a quantity of livestreamers in a livestreaming room) in the current room is small, all of the second objects may be used as the target objects.

When there are a plurality of first objects corresponding to the same media stream identifier, for example, there are a plurality of viewers in a livestreaming scenario, because relevant information of different first objects are likely to be different, based on the solutions of this application, for each of the first objects, the server may determine display attribute information of the second objects relative to the first object according to the relevant information of the first object and the relevant information of the second objects, to provide each of the first objects with media stream data matching the relevant information. The display attribute information of different first objects corresponding to a media stream of the same second object may be different.

In an some embodiments, the display attribute information includes the first information. In this case, the server may determine, according to the object relevant information of the first object and the second objects, which second objects are target objects corresponding to the first object, that is, determine media streams of which second objects are provided to the first object. For example, a livestreaming room includes M livestreamers, and M≥1. For any viewer (a first object), the server may select, from the livestreamers according to the relevant information of the viewer and the livestreamers, livestreaming content of which livestreamers to be transmitted to a target terminal of the viewer. The determining, according to the relevant information of the first object and the relevant information of the second objects, display attribute information corresponding to the second objects includes:

determining, for each of the second objects, a correlation degree between the first object and the second object according to the relevant information of the first object and the relevant information of the second object, and using the correlation degree as first information corresponding to the second object.

The generating a target data stream according to the display attribute information corresponding to the second objects may include:

determining, from the second objects according to the correlation degrees Corresponding to the second objects, the at least one target object matching the first object; and generating the target data stream based on the media stream corresponding to the at least one target object.

For any second object, the correlation degree between the object and the first object represents a matching degree between the first object and the object. The correlation degree may be obtained by calculating according to the position information and/or the object attribute information of the first object and the second object. A higher correlation degree between a second object and the first object indicates a higher matching degree between the second object and the first object and that the second object is more likely to be a target object of the first object.

In one embodiment, the relevant information may include the position information. The determining, for each of the second objects, a correlation degree between the first object and the second object according to the relevant information of the first object and the relevant information of the second object includes:

determining a distance between the first object and the second object according to position information of the first object and position information of the second object, and representing the correlation degree between the first object and the second object by using the distance, the distance being in negative correlation with the correlation degree.

In this embodiment, for any viewer in a virtual room, the server may determine, from the livestreamers according to distances between the viewer and livestreamers, a target livestreamer that provides livestreaming content to the viewer. A longer distance indicates a lower matching degree between the livestreamer and the viewer. By using this solution, a media stream of a livestreamer having a higher matching degree (that is, a livestreamer closer to a first object) with a viewer is provided to the viewer. Accordingly, media streams received by terminals of different viewers may be different, and when position information of the same viewer changes, a received media stream may also change. For example, the position information is corresponding virtual position information (for example, position information of a virtual game object controlled by a game player in a game map) corresponding to a first object in a virtual scene. When at least one of the virtual position information of the first object or virtual position information of a second object changes, a target object corresponding to the first object may also have changed.

In another embodiment, the correlation degree between the objects may be calculated by the following methods:

calculating a first correlation between the first object and the second object according to the position information of the first object and the position information of the second object;

calculating a second correlation between the first object and the second object according to the object attribute information of the first object and the object attribute information of the second object; and obtaining the correlation degree between the first object and the second object according to the first correlation and the second correlation.

The first correlation represents a correlation degree between the first object and the second object on positions, and a shorter distance indicates greater correlation. The second correlation represents a correlation degree between the first object and the second object on preference, and greater correlation indicates more similar preference. After the correlation degrees of the two objects in the two dimensions, the correlation degree between the first object and the second object may be obtained by combining these two correlations. For example, the correlation degree may be obtained by multiplying or averaging the first correlation and the second correlation. Alternatively, a first weight corresponding to the position information and a second weight corresponding to the object attribute information are obtained, the correlation degree is obtained by performing weighed summation on the first correlation and the second correlation by using the first weight and the second weight.

In the data processing method according to some embodiments, according to a correlation degree between a viewer and a livestreamer in the same room, media streams of target livestreamers having higher correlation degree with the viewer may be provided to the viewer. By using this method, different media data (for example, livestreaming content of different livestreamers) can be provided to different viewers in the same room. Accordingly, a data processing method is more flexible, so that user experience can be improved. In some embodiments, for any viewer, a target data stream corresponding to the viewer may alternatively include display method prompt information (for example, the foregoing second information or the prompt information corresponding to the second information) of the media streams of the target livestreamers. After receiving the media streams including the target livestreamers and the display method prompt information of the media streams, the target terminal may further display the media streams of the target livestreamers to the viewer according to respective display methods, to implement different display of the media data of different livestreamers, thereby better improving user experience.

In different application scenarios, forms of media streams may be different. For example, there is only audio data in some scenarios, and there is only video data in some scenarios. The video data may have only video pictures or both video pictures and audio data. In specific application, for audio, regardless of which direction the sound is from a first object, the first object can hear sound within a specific auditory distance (an audible distance). For the video data, in addition to a visual distance of the first object, whether the first object can view a video picture is also related to a current orientation (a line-of-sight direction) of the first object. In consideration of this factor, in an some embodiments, when the media stream includes a video stream. The position information includes an orientation and position coordinates of an object. The method may further include:

determining, for each of the second objects, a viewing angle deviation of the second object relative to the first object according to position coordinates of the second object and the position information of the first object; and determining the at least one target object from the second objects according to the distances corresponding to the second objects includes:

determining the at least one target object from the second objects according to the distances and the viewing angle deviations corresponding to the second objects.

Based on the solution, for the video stream, whether the second object is within a visual range of the first object may be determined from two dimensions of a visual distance and a visual angle. If the second object is within the visual range, the second object may be used as the target object. The visual angle of the object may be a preset angle, may be configured by default by the server, or may be set by the first object.

By using the solution according to this application, the distance between the first object and the second object may be calculated according to position coordinates of the first object and the position coordinates of the second object. The viewing angle deviation of the second object relative to the first object may be calculated according to the position information (coordinate position and orientation) of the first object and the position coordinates of the second object. If the angle deviations is within a visual angle range of the first object, for example, the visual angle range of the first object is 150 degrees, that is, 75 degrees to the left and right of the line of sight of the first object. If an included angle between the second object and the current line of sight of the first object does not exceed 75 degrees, the second object is regarded as being within the visual angle range of the first object. If a distance between the second object and the first object is not greater that a preset value, and the second object is within the visual angle range of the first object, the second object may be used as the target object.

In an some embodiments, when the distance between the objects is used to represent the correlation degree between the objects, determining the at least one target object from the second objects according to the distances corresponding to the second objects may be determining distances that are in the distances corresponding to the second objects and that are not greater than the preset value as target distances, and determining second objects corresponding to the target distances as the target objects, to be specific, providing livestreaming content of a livestreamer within a specific distance from a viewer to the viewer.

To ensure that the first object can obtain a media stream corresponding to at least one second object, or to avoid a problem of poor object experience caused by providing excessive media streams of the second objects to the first object. In this embodiments of this application, the determining distances that are in the distances corresponding to the second objects and that are not greater than a preset value as target distances, and determining second objects corresponding to the target distances as the target objects may include:

Method 1: Determine, by adjusting the preset value if a quantity of the target distances does not satisfy a preset quantity requirement, target distances satisfying the preset quantity requirement from the distances corresponding to the second objects, and determine second objects corresponding to the target distances as the target objects.

Method 2: Use, if a quantity of the target distances is greater than a set quantity, the second objects corresponding to the target distances as candidate objects, obtain quality of media streams corresponding to the candidate objects, and determine the at least one target object from the candidate objects according to the quality of the media streams corresponding to the candidate objects.

For the foregoing method 1, the preset quantity requirement may be a preset quantity range. The preset quantity range may be a set value or a value range. The range may include a plurality of positive integers. The set value may include at least one of an upper limit value or a lower limit value of the quantity. The upper limit value is used to limit a maximum quantity of the target objects. The lower limit value is used to limit a minimum quantity of the target objects. The value range is used to limit a quantity of final target objects to belong to this range. According to the preset quantity requirement, if the quantity of the target objects selected according to the initial preset value does not satisfy the requirement, the preset value may be adjusted one or more times, and satisfied target objects is re-determined according to the adjusted preset value, until the determined quantity of the target objects satisfies the preset quantity requirement. For example, the preset quantity requirement includes the lower limit value. The lower limit value may be a positive integer not less than 1. An example in which the lower limit value is 1 is used as an example. If the distances between the second objects and the first object are greater than the initial preset value, the quantity of the target objects is 0, which does not satisfy the requirement. In this case, the preset value can be increased according to a preset interval, and the target objects may be re-determined according to the increased preset value. Similarly, if the preset quantity requirement includes an upper limit value and the quantity of the distances that are in the distances between the second objects and the first object and that are not greater than the initial preset value is greater than the upper limit value, the preset value may be decreased according to a specific interval, and the target objects may be re-determine according to the decrease preset value.

For the foregoing method 2, because the media streams of the second objects are received by the server from the user terminals of the second objects, and information such as terminal performance of different user terminals, a data transmission link between the user terminal and the server, and network quality on the user terminal side is different, the quality of the media streams of different second objects is usually different. For example, in a livestreaming scenario, quality of livestreaming video streams corresponding to different livestreamers may be different. For example, picture definition, lags, and the like may vary. In consideration of the above reasons, if the quantity of the target objects selected according to the distances between the first object and the second objects and the preset value is excessively large (greater than a set quantity), the objects may be further screened according to the quality of the media streams of the objects. For example, a set quantity of target objects with media streams having optical quality is selected.

A specific evaluation and determining method of the quality of the media streams is not limited in embodiments of this application, and any existing method of evaluating the quality of the media data may be used to determine the quality of the media streams. In some embodiments, the quality of the media streams corresponding to the second objects may be evaluated according to information between a target server and a server of the second object, such as a data transmission delay and a packet loss rate. Alternatively, a trained neural network model may be used to predict the quality of the media streams corresponding to the second objects.

Through the foregoing solutions, a problem that the first object is not likely to obtain any media stream can be avoided, excessive media streams being provided to the first object can be avoided, and the first object is provided with media streams of better quality as much as possible, such as video streams or audio streams with good quality.

In another embodiment of this application, the method may further include:
obtaining quality of media streams corresponding to the second objects; and determining the at least one target object from the second objects according to the quality of the media streams corresponding to the second objects.

In this solution, which media streams of the second objects are provided to the first object may be selected according to the quality of the media streams of the second objects, to implement automatic screening according to quality, so that the first object can obtain quality-guaranteed media streams, to avoid providing media streams with poor quality to the object, resulting in a decrease in user experience. In some embodiments, second objects corresponding to media streams with quality being not lower than preset quality may be directly used as the target objects. Alternatively, in an order of quality from high to low, second objects corresponding to a specific quantity of high-ranking quality is determined as the target objects.

In some embodiments, when selecting the target objects from the second objects, the correlation degrees between the first object and the second objects and the quality of the media streams of the second objects may alternatively be jointly used for determining. In one embodiment, correction coefficients for the correlation degrees between the second objects and the first object may be determined according to the quality of the media streams of the second objects. The correlation degrees are corrected by using the correction coefficients. The target objects are determined from the second objects according to the modified correlation degrees Corresponding to the second objects. For example, each of the correction coefficients may be an integer belonging to a specific value range, and the correction coefficients corresponding to the second objects are in positive correlation to the quality of the media streams of the second objects. For example, after obtaining the quality of the media streams of the second objects by calculating, the quality of the media streams is normalized according to the value range of the correction coefficients. The quality of the media streams is normalized to be within the value range of the correction coefficients, and the normalized quality of the media streams is used as the correction coefficients. For each of the second objects, the correction coefficient corresponding to the object may be added or multiplied by the correlation degree between the object and the first object to obtain a corrected correlation degree.

In the solution of this application, the target objects matching the first object may be determined from the second objects by using, but not limited to, the foregoing specific implementations. In some application scenarios, there is no need to select the target objects, and all of the second objects may be used as the target objects. For example, in a multi-person online video conference or a voice conference scenario, all conference participants have the right to speak. In this case, all conference participants are both viewers and livestreamers. If a quantity of current conference participants is small, for any conference participant, another participant may be a target object corresponding to the participant.

A specific quantity of the target objects finally selected is not limited in embodiments of this application, and may be configured and adjusted according to specific application scenarios. In some embodiments, the quantity of the target objects may be determined by using the following methods:

determining a total quantity of objects corresponding to the streaming media identifier; and determining a quantity of the target objects according to the total quantity.

Based on this embodiment, the quantity of the target objects may be determined according to the total quantity of users in the current room to implement adaptive adjustment of the quantity of the target objects. In some embodiments, the total quantity is in positive correlation to the quantity of the target objects. A larger total quantity indicates a larger quantity of the target objects. In another embodiment, the total quantity may refer to a total quantity of the second objects corresponding to the current streaming media identifier, that is, a total quantity of livestreamers in the current room. In specific implementation, if the total quantity of the livestreamers in the current room is less than a specific quantity, all of the livestreamers may alternatively be the target objects. In the foregoing embodiment of determining the quantity of the target objects, a corresponding quantity of the target objects may be selected from the second objects according to the relevant information of the first object and the second objects. For example, according to the correlation degrees between the objects, a corresponding quantity of second objects with a high correlation degree of are selected as the target objects, and media streams of these objects are provided to the first object.

In a case that the target objects corresponding to the first object are determined, that is, when it is known which media streams of the second objects need to be provided to the first object, in an some embodiments, the relevant information may include the position information, and the display attribute information includes the second information, that is, the information configured for determining the display methods of the media streams. The determining, according to the relevant information of the first object and the relevant information of the second objects, display attribute information corresponding to the second objects may include:

determining, for each of the target objects, orientation indication information between the target object and the first object according to the position information of the first object and position information of the target object, and using the orientation indication information as second information corresponding to the target object.

The generating a target data stream according to the display attribute information corresponding to the second objects may include:

generating the target data stream according to the orientation indication information corresponding to the target objects and the media stream corresponding to the target objects. The target data stream further includes the orientation indication information corresponding to the target objects. The orientation indication information is configured for indicating that the target terminal displays, according to the orientation indication information corresponding to the target objects, the media streams corresponding to the target objects to the first object.

In some embodiments, after determining the target objects corresponding to the first object, the server may transmit the media streams of the target objects to the first object. In some embodiments, the target data stream is generated directly according to the media streams of the target objects (or the media streams and the orientation indication information) and is transmitted to the target terminal. In another embodiment, before the generating a target data stream, the method may further include:

transmitting a target object list to the target terminal to display the target object list to the first object by using the target terminal, the target object list including object identifiers of the target objects; and receiving object selection feedback information transmitted by the target terminal for the target object list, the object selection feedback information being generated by the target terminal in response to a selection operation of the first object on the target object list.

The media stream included in the target data stream is a media stream of the at least one target object corresponding to the object selection feedback information.

In other words, before transmitting the media streams of the target objects to the first object, the first object may select media streams of which target objects that the first object wants to receive. The first object may select some or all of the objects in the list according to needs. In this case, the server may transmit, according to the selection of the first object, media stream data corresponding to some or all of the target objects to the target terminal.

In another embodiment, when receiving the media data obtaining trigger operation (such as entering a livestreaming room) of the first object, the server may first display an interface of a media data display mode option to the first object through the target terminal of the first object. The option may include a first mode and a second mode. If the first object selects the first mode, the server may provide the media streams to the first object by performing the methods shown in the foregoing S110 to S140. If the second objects select the second mode, the media streams of the second objects may be provided to the first object in other manners. In some embodiments, the target object list may alternatively be provided to the first object, and the first object selects media streams of which target objects to provide to the first object. In some embodiments, because the target object corresponding to the first object may change, when the target object corresponding to the first object changes, a latest target object list may be transmitted to the first object, and the first object may perform selection again. In some embodiments, an object list may alternatively be transmitted to the target terminal. The list may include object identifiers of the second objects, the object identifiers of the target objects, or the object identifiers of the target objects and the object identifiers of the second objects that are not the target objects, so that the first object may have more choices. For example, the object identifiers may include the identifiers of all of the target objects and an identifier of at least one non-target object. Different prompt information may alternatively be presented on the identifiers of the target objects and the non-target objects. The prompt information may inform the first object about differences between the target objects and the non-target objects, for example, the target objects are the objects within which distance range from the first object.

In the data processing method according to some embodiments, livestreamers may be recommend to users based on factors such as the position information of the objects, the object attribute information, or the quality of the media streams, or smart display of the media data may be provided to the users based on one or more of these factors, so that a real-time communication solution for realistic and immersive mutual communication can be implemented, thereby better satisfying user needs and improving user experience.

The data processing method according to some embodiments may alternatively be performed by the user terminal. When performed by the user terminal, the data processing method may include:

displaying, in response to a media data obtaining trigger operation of a first object corresponding to the target application program, a media stream of at least one target object in second objects in a candidate data set to the first object.

The second objects have corresponding display attribute information. The at least one target object is a second object determined from the second objects. The media stream of the at least one target object matches display attribute information corresponding to the at least one target object. The display attribute information corresponding to one of the second objects is configured for identifying a display attribute of a media stream of the second object corresponding to the first object. The display attribute information matches relevant information of the first object and relevant information of the second object. The relevant information includes at least one of position information and object attribute information. The first object and the second objects are objects corresponding to a same streaming media identifier of the target application program.

In some embodiments, the media data obtaining trigger operation is an operation triggered by the first object to obtain media data from a server of the target application program, and may include but is not limited to a trigger operation of the first object entering a virtual scene corresponding to the same streaming media identifier, for example, an operation of the first object tapping on a user interface of a livestreaming-type application program to enter a livestreaming room, an operation of tapping to start a game matching in a game application, and an operation of joining a conference in an online conference scenario. When obtaining the operation of the first object, the user terminal of the first object may display the media stream of the at least one second object to the first object according to relative relationships between the first object and the second objects, to implement display of the media data matching the first object.

After obtaining the media data obtaining trigger operation of the first object, the user terminal of the first object may transmit a media data obtaining request to the server. The server may obtain the relevant information of the first object and the relevant information of the second objects to determine the display attribute information of the media streams of the second objects relative to the first object, and generate, according to the display attribute information corresponding to the second objects, corresponding target data streams and transmit the target data streams to the user terminal. The user terminal may display to the first object the media data that is transmitted by the server and that matches the relevant information of the first object. In some embodiments, the media data matching the relevant information of the first object may refer to the media stream that is of the at least one second object and that matches the first object, or display methods of the media stream of the at least one second object and the media streams of the second objects.

Based on the method according to this application, for each stream pulling end object (that is, the first object, such as viewers corresponding to the same livestreaming room) in the same streaming media identifier, media data displayed to the object by a user terminal of the object matches display attribute information of stream pushing end object (that is, the second object, such as livestreamers corresponding to the same livestreaming room) corresponding to the streaming media identifier relative to the object. The display attribute information of a second object relative to the first object may reflect a relative relationship (such as a correlation degree) between the second object and the first object. Based on this method, the media data provided to the first object may be determined according to the relative relationships between the second objects and the first object. The media data includes a media stream of at least one second object. For example, the display attribute information includes first information configured for representing whether to display the media stream of the second object to the second object. If the first information corresponding to a second object indicates not to display the media stream of the second object to the first object, a media stream displayed to the first object by a user terminal of the second object does not include the media stream of the second object.

The method may further include: displaying, in response to that the display attribute information corresponding to the second objects changes, a media stream of at least one target object matching changed display attribute information corresponding to the second objects to the first object.

In other words, if the display attribute information of the media streams of the second objects relative to the first object changes, the media data of the first object presented by the user terminal of the first object may also change. This change may indicate that the target objects have changed or the display methods of the media streams of the target objects have changed.

The change of the display attribute information corresponding to the second objects is caused by the change of the relevant information of the first object or the relevant information of the second objects. For example, relative position relationships (such as distances) between the first object and the second objects may be determined according to the position information of the first object and the position information of the second object, and the display attribute information may be determined according to the relative position relationships between the first object and the second objects. The target objects corresponding to the first object may be second objects that are in the second objects that has distances from the first object being less than a preset value, and the user terminal of the first object may display the media streams of the target objects to the first object. In some embodiments, if the current target objects changes relative to the target objects in a previous period, only the media streams of the current target objects may be displayed to the first object. For example, the current target objects are an object A and an object B, and the target objects in the previous period are the object A and an object C. Currently, media streams of the object A and the object B are provided to the first object.

In an some embodiments, the display attribute information includes the first information. The first information is configured for determining whether to provide the media streams of the second objects to the first object.

In some embodiments, the displaying a media stream of at least one target object in second objects to the first object includes:

using second objects located within a visual range of the first object and/or located within an audible distance of the first object as the target objects, and displaying the media streams of the target objects to the first object.

In other words, the second objects located within the visual range and/or the audible distance of the first object belong to the target objects, and the user terminal may only display the media streams of the target objects to the first object. The second objects located within the visual range of the first object means at least one of the distances between the second objects and the first object being within the visual distance of the first object or the second objects being located within the visual angle of the first object. Locating within the audible distance of the first object means that the distances between the second objects and the first object are less than a set distance.

In an some embodiments, the display attribute information includes the second information. The second information is configured for determining a display method for displaying a media stream to the first object.

In some embodiments of this application, a personalized media stream display method may be provided for the first object. Specifically, the media streams of the target objects may be displayed to the first object according to relative orientations between the target objects and the first object. To be specific, the target terminal of the first object may determine relative orientation information between the target objects and the first object according to orientation indication information corresponding to the target objects, and display the media streams of the target objects to the first object according to the relative orientation information corresponding to the target objects.

For any target object, the orientation indication information between the first object and the target object may be any form of information and can determine a relative orientation between the two objects. In some embodiments, the orientation indication information may be indication information that is presented. For example, the orientation indication information corresponding to each of the target objects may be the relative orientation information between the target object and the first object (such as which orientation of the second object is at the first object). In other words, the server may directly inform the target terminal of relative orientations between the target object and the first object. The orientation indication information may alternatively be implicit indication information. For example, the orientation indication information may include position information of the target objects. The target terminal may determine the relative orientation information between the target objects and the first object according to the position of the first object and the position information of the target objects that is informed by the server. Relative orientation information corresponding to a target object may include but is not limited to a distance between the two objects, orientation information of the target object relative to the first object, and the like. The target terminal may display the media streams of the target objects to the first object based on the orientation indication information of the target objects by using a display method matching the orientation indication information. Accordingly, the first object can have immersive experience, so that user experience can be effectively improved, to better satisfy need in specific application.

In other words, relative orientation information between the second object and the first object may determine at least one of the first information or the second information corresponding to the second object. The first information determines whether to provide a media stream of each second object to the first object. The second information determines a display method of the media stream when the media stream of the second object is provided to the first object. The media stream displayed to the first object may be the media stream of some of the second objects that meet the conditions (for example, the second object whose distance from the first object is not greater than a preset value), or may be the media stream of all second objects. When the media streams of the two objects are displayed to the first object, they can be displayed according to the relative orientation information between each target object and the first object. For example, for audio streams, audio streams corresponding to the target objects may be played to the first object according to the relative orientations of the target objects and the first object by using a spatial audio playback method. For video streams, video images of the target objects may be presented on the user terminal of the first object according to the relative orientations of the target objects and the first object.

In an some embodiments, the media stream includes an audio stream. The target terminal may display the media streams corresponding to the target objects to the first object in the following methods:

determining, according to the orientation indication information corresponding to the target objects, spatial playback directions of audio streams corresponding to the target objects relative to the first object; and play the audio streams corresponding to the target objects to the first object by using a spatial audio playback method according to the spatial playback directions corresponding to the target objects.

In some embodiments, the target terminal may determine, according to the orientation indication information corresponding to the target objects, the relative orientation information corresponding to the target objects, and determine, according to the relative orientation information corresponding to the target objects, the spatial playback directions of the audio streams corresponding to the target objects relative to the first object.

In some embodiments, the orientation indication information may be the position information of the target objects, the relative orientation information between the target objects and the first object, or spatial playback direction indication information of the audio streams of the target objects. When the orientation indication information is the position information of the target objects. After receiving the audio streams and position information of the target objects transmitted by the server, for each target object, the target terminal may calculate the relative orientation of the target object and the first object according to the position information of the first object and the position information of the target object, so that a playback mode of the audio stream of the target object, that is, the spatial playback direction, may be determined according to the relative orientation. For example, the relative orientation may be directly used as a sound playback direction of the corresponding audio stream. Then the target terminal may play the audio streams of the target objects to the first object by using the spatial audio playback methods, so that the first object has more realistic and immersive audio experience.

As an example, for any viewer Z (a first object), it is assumed that target livestreamers (target objects) corresponding to Z are livestreamers A, B, C, and D. A is behind Z, B is on the right side of Z, C is on the left side of Z, and D is directly in front of Z. Based on the method according to this application, Z can hear the sound of A from behind, the sound of D from directly in front, the sound of B on the right side, and the sound of C voice on the left side.

In an some embodiments, the media stream includes a video stream. The target terminal may display the media streams corresponding to the target objects to the first object in the following methods:

determining, according to the orientation indication information corresponding to the target objects, video presenting positions of video streams corresponding to the target objects on a user interface of the target terminal; and presenting, according to the video presenting positions corresponding to the target objects, the video streams corresponding to the target objects to the first object.

In some embodiments, the target terminal may determine the relative orientation information of the target objects relative to the first object according to the orientation indication information corresponding to the target objects, and may determine video presenting positions of the video streams of the target objects on the target terminal according to the relative orientation information corresponding to the target objects.

For the video streams, the target terminals may play the video streams of the target objects to the first object according to the relative orientations between the first object and the target objects. In some embodiments, the orientation indication information may be the position information of the target objects, the relative orientation information of the target objects and the first object, or the presenting position indication information of the video streams of the target objects on the target terminal. In other words, specific presenting methods of the target video stream may be determined by the target terminal according to the received orientation indication information, or may be informed to the target terminal after being determined by the server according to the position information between the first object and the second objects.

In one embodiment, the target terminal may include at least two presenting regions (such as a plurality of display screens). The target terminal may determine, according to the relative orientation information between the target objects and the first object, target presenting regions corresponding to the video streams of the target objects, and present the video streams of the target objects to the first object according to target presenting regions corresponding to the video streams of the target objects. For example, the target terminal has two display screens placed on a left side and a right side opposite each other, and there are three target objects. Target objects a and b are both on the left of the first object, and another target object c is on the right of the second object. Video pictures of the target objects a and b are presented on the left display screen, and a video picture of the target object c is presented on the right display screen. For another example, the target object a is at the upper left of the first object, and the target object b is at the lower left of the first object. The video pictures of the target object a and the target object b may be presented on the upper part and the lower part of display screen opposite each other.

In specific application, the video streams may be video streams that only includes images or may be video streams that includes both images and audio. For the latter, based on the solutions according to embodiments of this application, at least one of a display method of pictures of the video streams or a display method of the audio in target objects may be determined based on relevant information of a first object and a second object, and the video streams of the target objects are displayed to the first object according to the display method of at least one of the video pictures of the audio.

The solutions according to embodiments of this application may be applied to a plurality of application scenarios, including but not limited to online communication scenarios such as online livestreaming, online games (including but not limited to various types of games such as table games and online shooting), online social contact, online education, Metaverse, online recruitment, and online contract signing. To better describe the method in some embodiments and utilitarian value thereof, the following describes the method in some embodiments with reference to a specific scenario embodiment. An online livestreaming travel scenario is used as an example for description in the scenario embodiment.

Figure 2:
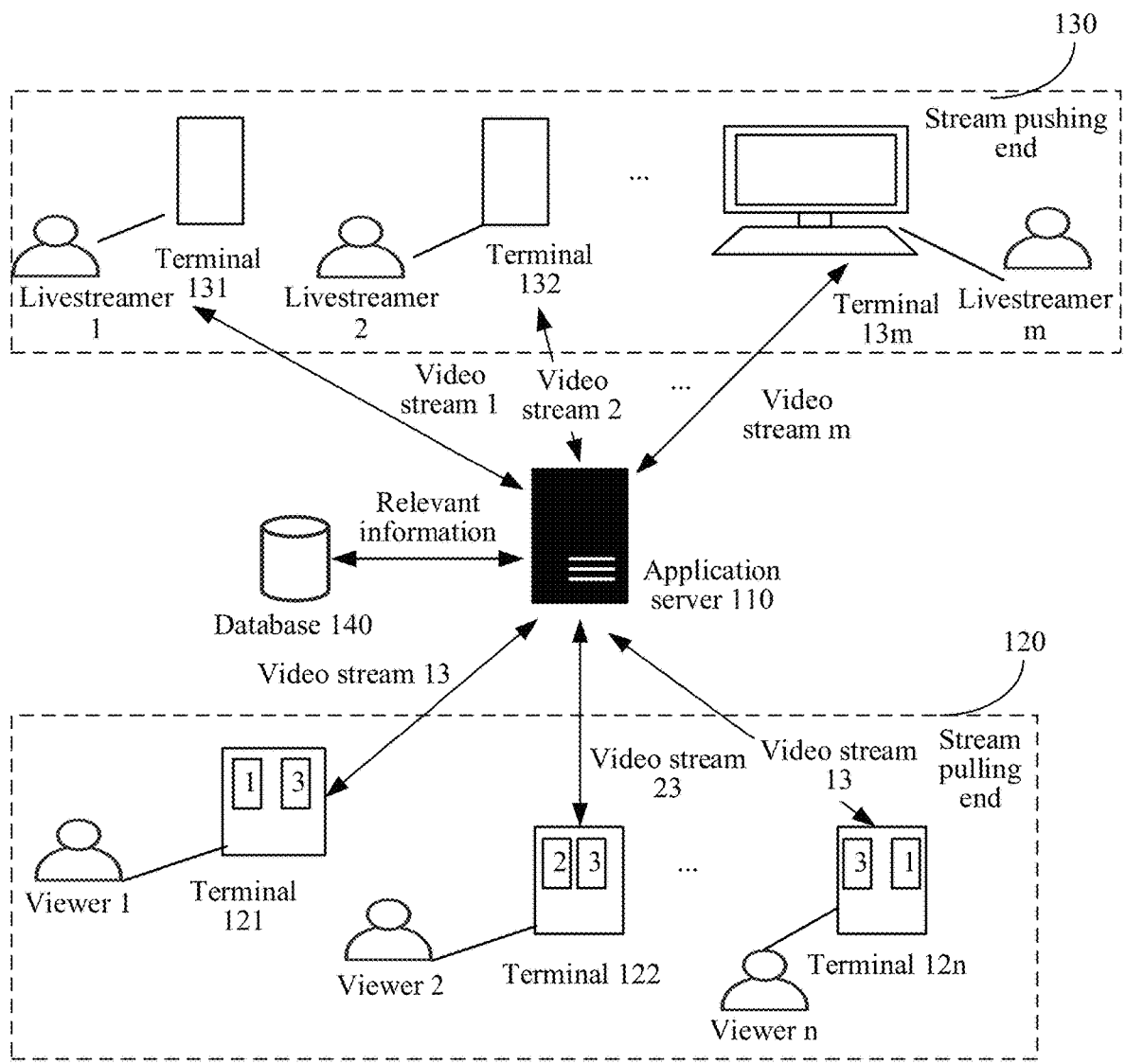
FIG. 2 is a schematic diagram of a structure of a data processing system according to an embodiment of this application.

In some embodiments, FIG. 2 is a schematic diagram of a structure of an implementation environment of a real-time communication system applicable to the scenario embodiment. As shown in FIG. 2, the implementation environment may include an application server 110 and a user terminal. The application server 110 is a server of a target application program, and may provide an online livestreaming service for a user of the target application program. In the scenario embodiment, a second object corresponding to the target application program is a livestreamer, and a first object is a viewer in a livestreaming room. The livestreamer may be a real livestreamer or an AI livestreamer (that is, a virtual livestreamer). The user terminal may be any terminal running the target application program. In the scenario embodiment, the user terminal includes a user terminal of the viewer and a user terminal of the livestreamer. FIG. 2 schematically shows n stream pulling ends (a terminal 121 of a viewer 1, a terminal 122 of a viewer 2, . . . , and a terminal 12n of a viewer n) and m stream pushing ends 130 (a terminal 131 of a livestreamer 1, a terminal 132 of a livestreamer 2, . . . , and a terminal 13m of a livestreamer m) in the same livestreaming room. Each of the stream pulling ends 120 and each of the stream pushing ends 130 may communicate with the application server 110 via a wired network or a wireless network. The terminal user may initiate online livestreaming as a livestreamer or enter the livestreaming room as a viewer via the target application program run on the user terminal. One livestreaming room may include a plurality of livestreamers at the same time.

The stream pushing end may acquire a video stream (that is, livestreaming content) of a livestreamer side by using a corresponding video acquisition device (which may be the terminal or an acquisition device connected to the terminal), compress and encapsulate the acquired video stream, and push the encapsulated video stream to the application server 110. For example, the terminal 131 transmit livestreaming content (a video stream 1) of the livestreamer 1 to the application server. The stream pulling end may pull existing livestreaming content of the server to the user terminal of the viewer, and display the pulled livestreaming content to the viewer.

Figure 3:
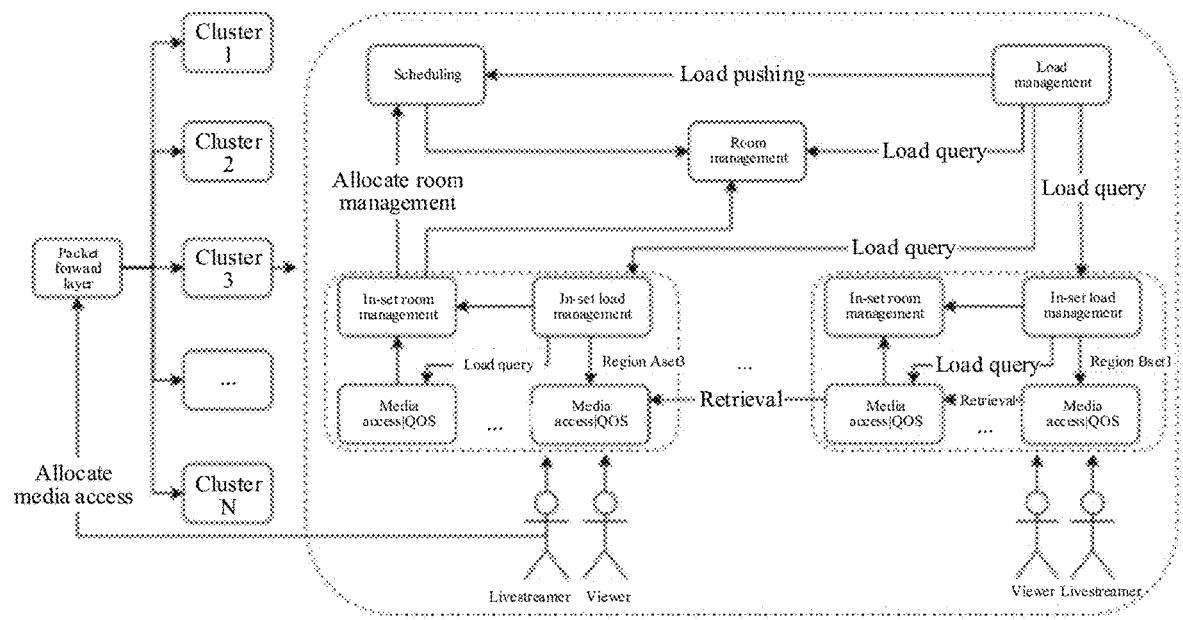
FIG. 3 is a diagram of an architecture of a real-time communication system according to an embodiment of this application.

A system architecture used by a backend service of the real-time communication system is not limited in embodiments of this application, and theoretically, any real-time communication architecture may be used. In one embodiment, FIG. 3 is a schematic diagram of a structure of a real-time communication system according to an embodiment of this application. For a user, in the real-time audio system, all devices other than a user terminal of the user may be understood as service nodes in an application server, and these service nodes operate collaboratively to provide a real-time audio service for the user.

In the architecture of the real-time communication system shown in FIG. 3, a regional media access service may be provided to the user according to regions. FIG. 3 schematically shows two different regions, that is, a region A and a region B. For the same region, if there are a large number of users in the region, partition processing may be further performed on the region, and a plurality of media access service regions may be configured for the region. In the figure, a region Aset3 is a region of the region A, and a region Bset1 is a region of the region B. Each of the media access service regions may include a media management node and a media access machine having a quality of service (QoS) module deployed thereon. The media management node may include an in-set room management module and an in-set load management module shown in FIG. 3. The media access machine may use a distributed deployment method.

The region A in FIG. 3 is used as an example. When deployment is performed on the region, a total quantity of media access needed may be calculated according to a total quantity of users in the region, and a ratio of media access operator may alternatively be allocated according to a ratio of operators. If 100 media access machines are need in the region A, and a ratio of different operators a, b, and c is 4:4:2, 40 media access machines corresponding to the operator a, 40 media access machines corresponding to the operator b, and 20 media access machines corresponding to the operator c may be deployed in the region A, and in-set load management and in-set room management is a set (region). If there are a large number of users in a specific region, a plurality of sets may be deployed in the region.

Distributed load management and distributed room management may be user in the system architecture shown in FIG. 3. Each set has a respective load management service, that is, the foregoing in-set load management module, and the in-set load management module collects load of modules (including the media access machines) in the set. Each set has a respective room management module responsible for managing rooms and users in the set. When the room management module terminates, migration recovery may be implemented by the media access and the in-set room management module. The distributed QoS module is deployed in the media access machine and is configured to perform QoS regulation and control on local users.

A service system of the system architecture may be accessed via a unified media. Each of the media access machines may access a client of a livestreamer and a client of a viewer. No distinction is made between an interface machine and a proxy, and both the livestreamer and the viewer may be uniformly connected to the media access machines. The viewer may directly uplink audio and video data after switching roles without a process of exiting the room and entering the room again to be connected to the interface machine.

A room management module (room management in FIG. 3) and a load management module (load management in FIG. 3) of an upper level are further configured in the system architecture. The in-set load management module and the in-set room management module may be referred to as second-level management modules, and the room management module and the load management module of the upper level may be referred to as first-level management modules. The second-level management modules are configured to perform room management and load management on devices in the set, and the first-level management modules are configured to manage the regions. The first-level management modules may receive reports of the second-level management modules in the regions to manage and control the regions. For example, first-level load management modules may obtain load information (for example, a quantity of users that have been accessed, load of a media access set, and resource occupation of the devices) of the regions from second-level load management modules. The first-level load management module may transmit the load information of the regions to a scheduling module. The scheduling module may perform media access scheduling on the regions according to the received information.

The following briefly describes a process of a user entering a livestreaming room with reference to the system structure shown in FIG. 3. The process may include the following steps:

(a) A client transmits a media access allocation request to a packet forward layer (a forward node). The media access request may include a streaming media identifier and a client identifier (a user identifier).

(b) The packet forward layer determines, according to the user identifier or a room number, a cluster to which a user belongs, and forwards the access request to a scheduling module (scheduling shown in the figure) of a corresponding cluster.

In some embodiments, the packet forward layer may be preconfigured with clusters respectively corresponding to a plurality of streaming media identifier ranges, for example, cluster 1 to cluster N shown in FIG. 3. Different clusters correspond to different streaming media identifier ranges. After receiving the media access request, the packet forward layer may determine, according to the streaming media identifier in the media access request, a streaming media identifier range to which the streaming media identifier is in, determine a target cluster according to the streaming media identifier range, and forward the access request to a scheduling module corresponding to the target cluster.

(c) The scheduling module allocates media access machines for the media access request.

Based on the system architecture shown in FIG. 3, when allocating the media access machines, the scheduling module may not need to perform aggregation scheduling of a single-unit level but aggregation scheduling of a set-unit level. Specifically, a set may be selected according to load of adjacent sets, and a media access machine may be selected in the set by using a weighted random method based on load of the media access machine. Because a processing capability of a single set (each set may include a plurality of media access machine) is a hundred times that of a single media access machine, the set can be resistant to entering room under high concurrency more easily and effectively, to prevent excessive aggregation of single machines. The entire process of scheduling allocation may be completed locally, so that the process can be greatly simplified. Finally, the allocated media access machine is returned to the client. For example, an IP address of the media access machine is transmitted to a user terminal.

(d) After receiving the address of the media access machine, the client is connected to the media access machine (media access|QOS shown in the figure).

If a room which the client in the media access machine requests to enter exists, the livestreaming room entry process is completed. Otherwise, corresponding processing may be performed according to a preconfigured policy. For example, an in-set room management module and the scheduling module may follow a livestreaming room entry policy, so that the user finally enters the livestreaming room. Alternatively, the user may be prompted that the livestreaming room does not exist and may perform the livestreaming room entry process again.

In the scenario embodiment, after the user enters the livestreaming room, under the premise of user authorization, the media access machine may obtain attribute information of the users, for example, preference information of the users, in the livestreaming room. In some embodiments, in some embodiments, the client of the target application program may alternatively provide the users with various personalized setting options. The users may configure some data transmitting and receiving methods when participating in livestreaming according to needs. In some embodiments, the setting options may include but are not limited to a hearing distance setting item, a sight distance setting item, a visual angle setting item, and the like. These options may have respective default values, and the users may modify a corresponding hearing distance range, a visualization range, and the like through these options. Under the premise of user authorization and consent, some tag information may alternatively be configured for the users through statistical analysis based on the historical operation information of the users and interactions between the users in a real-time communication process. The tag information may alternatively be used as attribute information of the users. For example, for users who have chatted with each other for a long time, common tags may be summarized, and for users who have been chatted with for a long time, popularity values of the users may be accumulated. When there are many target objects selected, in addition to considering quality of media streams of the objects, the target objects may be further filtered based on popularities of the target objects.

Figure 4:
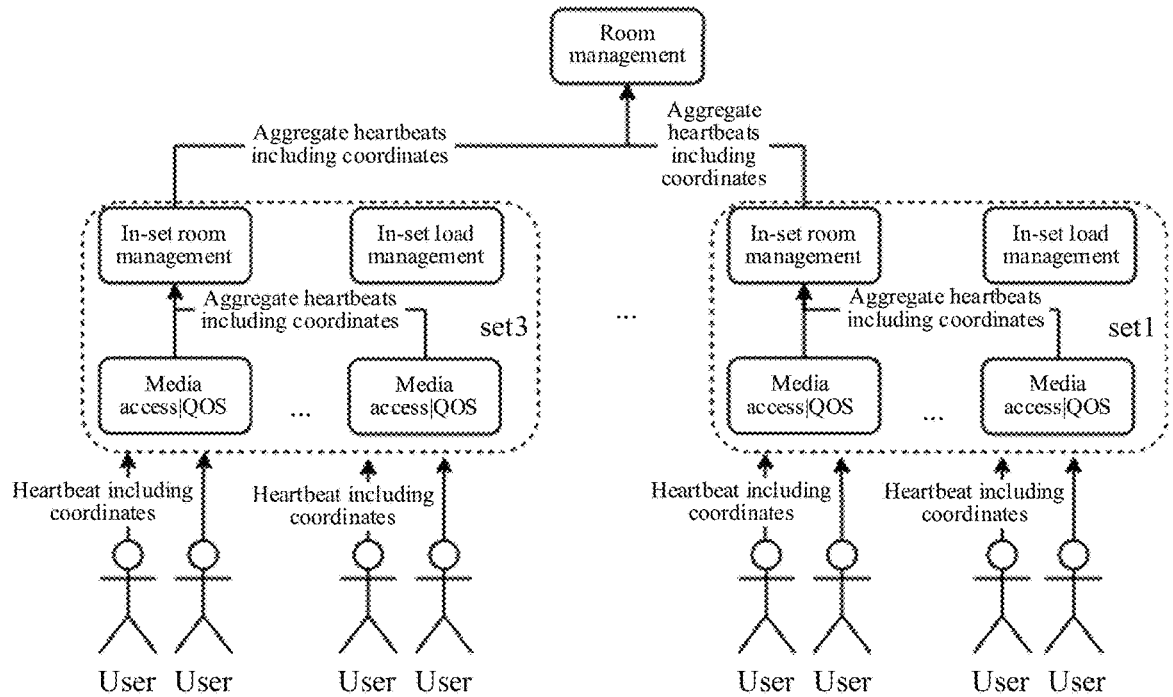
FIG. 4 is a schematic diagram of a principle of obtaining position information according to an embodiment of this application.

For the position information, the user terminal may report the position information of the user terminal to a media access machine to which the user terminal is accessed. FIG. 4 is a schematic diagram of a principle of reporting a real-time position based on the system structure shown in FIG. 3. In this scenario embodiment, the streaming media identifier may include but is not limited to a room identifier of a live livestreaming room. A user in FIG. 4 may be any user in the livestreaming room, including a livestreamer and a viewer. In some embodiments, as shown in FIG. 4, a terminal of the user may transmit, once per second, a heartbeat signal (a heartbeat including coordinates) including position information of the user to the media access machine to which the terminal is accessed. The position information may include position information of {an X-axis coordinate, a Y-axis coordinate, an orientation (such as a rotation angle relative to the Y axis)}. Selection and setting of a coordinate system are not limited in embodiments of this application. After the media access machine obtains the real-time position heartbeats of the users, the position information of the users may be aggregated and transferred to the in-set room management module, and the in-set room management module further aggregates the position information and then transfers the position information to the first-level room management modules. In some embodiments, the media access machine may aggregate the received position information of the user according to a preset interval and transmit the position information to the in-set room management module. Alternatively, the position information of the user may be determined. If the current position information of the user is found changed relative to the previously received position information, the position information is reported to the in-set room management module. For example, the position information is reported when a distance between two adjacent position information of the user is greater than a preset distance. Similarly, the in-set room management module may alternatively report, according to changes in the position information of the user, to the first-level room management module after aggregation.

The position information may be specific longitude, latitude coordinates and orientation, or virtual coordinates. For example, in an online travel livestreaming scenario, a travel environment may be a real environment or a virtual environment. In the virtual environment, a user may control a target virtual character of the user to travel in the virtual environment. In the real environment, a livestreamer may provide livestreaming services to viewers in the real environment and provide online travel experience to the viewers.

In some embodiments, the application server 110 may store relevant information of objects (relevant information of viewers and relevant information of livestreamers) corresponding to the terminals accessed to the application server 110 in a database 140. For any viewer in the same livestreaming room, the application server 110 may perform the data processing method according to embodiment of this application based on the information stored in the database 140, and the media access machine may provide, based on relevant information of the viewer and relevant information of the livestreamer in the livestreaming room, the viewer with media data that is more suitable for the viewer. As shown in FIG. 2, the application server 110 transmits a video stream 13 including livestreaming content of the livestreamer 1 and the livestreamer 3 to the terminal 121 according to relevant information of the viewer 1 and relevant information of the m livestreamers. The terminal 121 may present a livestreaming picture 1 of the livestreamer 1 and a livestreaming picture 3 of the livestreamer 3 according to a relative position relationship (the relative orientation information may include the relative position relationship) between the livestreamer 1 and the viewer 1 and a relative position relationship between the viewer 1 and the livestreamer 2. Specifically, the livestreaming picture 1 of the livestreamer 1 is displayed on a left side of the terminal 121, and the livestreaming picture 3 of the livestreamer 3 is displayed on a right side of the terminal 121. For viewer 2, the application server 110 transmits a video stream 23 including livestreaming content of the livestreamer 2 and livestreaming content of the livestreamer 3 to the terminal 122. The terminal 122 presents a livestreaming picture 2 and the livestreaming picture 3 of the livestreamer 2 and the livestreamer 3. The terminal 12$n$ presents the livestreaming picture 1 of the livestreamer 1 and the livestreaming picture 3 of the livestreamer 3 in the video stream 13 transmitted by the server to the terminal to the viewer n. A presenting method of livestreaming picture 1 and the livestreaming picture 3 on the terminal 12*n* is shown in FIG. 2, which is different from a display method of the livestreaming picture 1 and the livestreaming picture 3 on the terminal 121.

Figure 5:
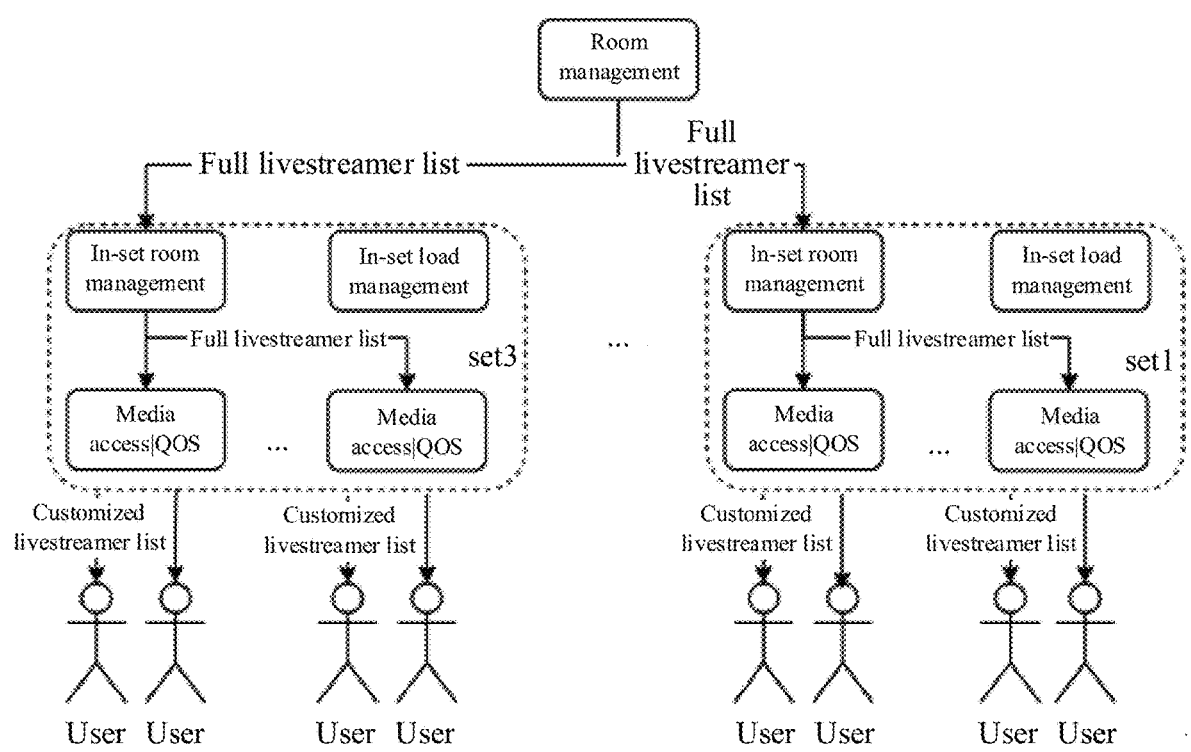
FIG. 5 is a schematic diagram of a principle of a data processing method based on the system shown in FIG. 3 according to an embodiment of this application.

In some embodiments, as shown in FIG. 5, the first-level room management module may add attribute information of the livestreamers and real-time position information the livestreamers to signaling pushed by a livestreamer list (a full livestreamer list) to the in-set room management module in the same room. Then the in-set room management module diffuses the information to all media access machines in the same room. The media access machine may customize a livestreamer list according to characteristics of the users based on the relevant information of the livestreamers and the viewers in the same room and deliver the livestreamer list to the user, which may include but is not limited to the following methods:

(1) Fixed range recommendation: For audio, a maximum hearing distance that a user can hear may be set, and livestreamers within a hearing distance radius are included in the customized livestreamer list. For a video, a sight distance and an angle that a user can see another user may be set. For example, a sight distance radius is d, and a sight distance angle is 150° directly in front of a user orientation, that is, 75° on the left and right sides.

(2) Position range smart recommendation: According to a quantity of users in the current room, it can be ensured that the users can see and hear closer livestreamers. If there are many users within a sight distance range or a hearing distance range, closer livestreamers may be given priority.

(3) Quality range smart recommendation: According to a quantity of users in the current room, it can be ensured that the users can see and hear livestreamers with relatively good quality. If there are many users within a sight distance range or a hearing distance range, livestreamers with low delay, louder volume, and clearer picture, that is, livestreamers with better media stream quality, may be given priority to be selected.

(4) Object attribute range smart recommendation: According to attribute information that a user carries when entering a room, livestreamers that the user may be more interested in are given priority to be recommended.

(5) Comprehensive range smart recommendation: A livestreamer list may be customized by combining the foregoing recommendation policies (1) to (4).

The foregoing recommendation policies are described below with two examples. Both the two examples may alternatively be used together.

Example 1: Position-Based Audio Livestreamer List Recommendation

Figure 6:
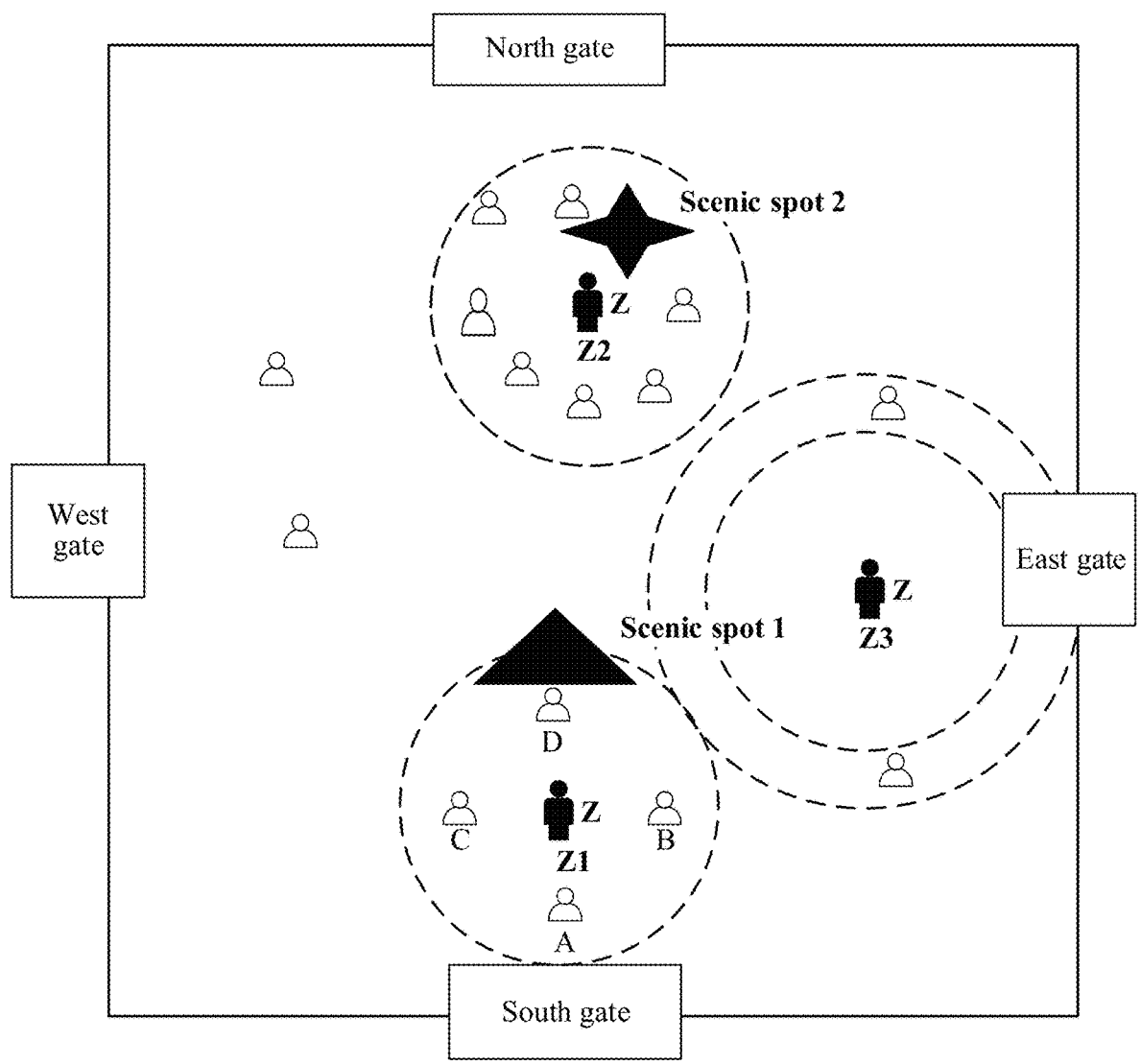
FIG. 6 is a schematic diagram of an environment map according to an embodiment of this application.

FIG. 6 is a schematic diagram of a travel environment. The environment may be a real environment, a virtual environment, or a combination of virtual and real environments. There are 4 gates in the travel environment in this example. A user Z in the figure is any viewer in a livestreaming room in this example. Other users than the user Z shown in the figure are livestreamers. It is assumed that a hearing distance range of the user Z, that is, a maximum hearing distance, is a radius d.

Audio scenario 1: Based on the solution according to some embodiments, as shown in FIG. 6, when the user Z or a virtual character of the user Z moves to a position Z1 a scenic spot 1, there are four livestreamers (objects with distances from user Z being not greater than a preset value), namely A, B, C, and D, within the hearing distance range (a range covered by a circle covered by dashed lines with Z1 as the center, in which a radius of the circle is d, and the radius d is the preset value in this example). In this case, a livestreamer list (a target object list) delivered to a user terminal of the user Z by a media access machine includes relevant information of the four livestreamers A, B, C, and D. The user Z may select to automatically listen to all of the four livestreamers or conversations, or may manually select to listen to some of the livestreamers or conversations.

Figure 7:
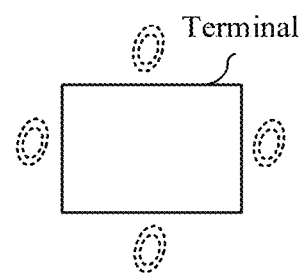
FIG. 7 is a schematic diagram of a display method of audio data according to an embodiment of this application.

Based on the selection of user Z, the media access machine may transmit audio data of the selected livestreamers to the user terminal of the user Z. After receiving audio of the livestreamers, the user terminal may play the audio data of the livestreamers to Z by using a spatial audio playback method. For example, an included angle between an orientation angle of Z and Y is 0 (facing due north on the map in FIG. 3). A is behind Z, and Z hears the sound of A from the behind. D is directly ahead of Z, and Z hears the sound of D directly ahead. B is on the right side of Z, and Z hears sound of B on the right side. C is on the left side of Z, and Z hears sound of C on the left side. As shown in FIG. 7, the user Z may listen to the audio data from the livestreamers in different orientations. Dashed lines in the figure represent the audio data in different directions.

Audio scenario 2: When the user Z moves to a Z2 position near a scenic spot 2 on the map, there are a plurality of livestreamers within the hearing distance range. As shown in FIG. 6, there are a total of seven livestreamers. In this case, a livestreamer list that may be delivered by a media access machine includes all of the seven livestreamers. If it is too noisy, an optimal livestreamer may be selected according to the foregoing position range smart recommendation, quality range smart recommendation, attribute range smart recommendation, or a comprehensive quality range, to ensure optimal listening experience of the user Z. For example, the seven livestreamers may be used as candidate objects. According to distances between each of the seven livestreamers and Z, four closer livestreamers may be selected as final target objects, and audio data of these livestreamers may be transmitted to the user Z. Similarly, after receiving the audio of the livestreamers, Z may play the audio data of the livestreamers to the user Z by using a spatial audio playback method.

Audio scenario 3: When the user Z moves to a Z3 position on the map, there is no livestreamer within the default hearing distance range (a small circle with Z3 as the center) of the user Z. In some embodiments, the hearing distance range may be expanded, that is, a preset value of the distance mat be adjusted (a large circle with Z3 as the center). After appropriately expanding the hearing distance range. As shown in FIG. 6, there are two livestreamers within the hearing distance range. Then, audio data of the two livestreamers may be provided to the user Z with reference to the processing method of the foregoing audio scenario 1, and play the audio data to the user by a spatial audio playback method.

Example 2: Position-Based Video Livestreamer List Recommendation

In this example, it is assumed that a visual radius of a user Z (the farthest distance that can be seen) is d, and a visual angle is $\alpha$ (an angle range of $\alpha/2$ on the left and right in front of the line of sight of the user).

Figure 8:
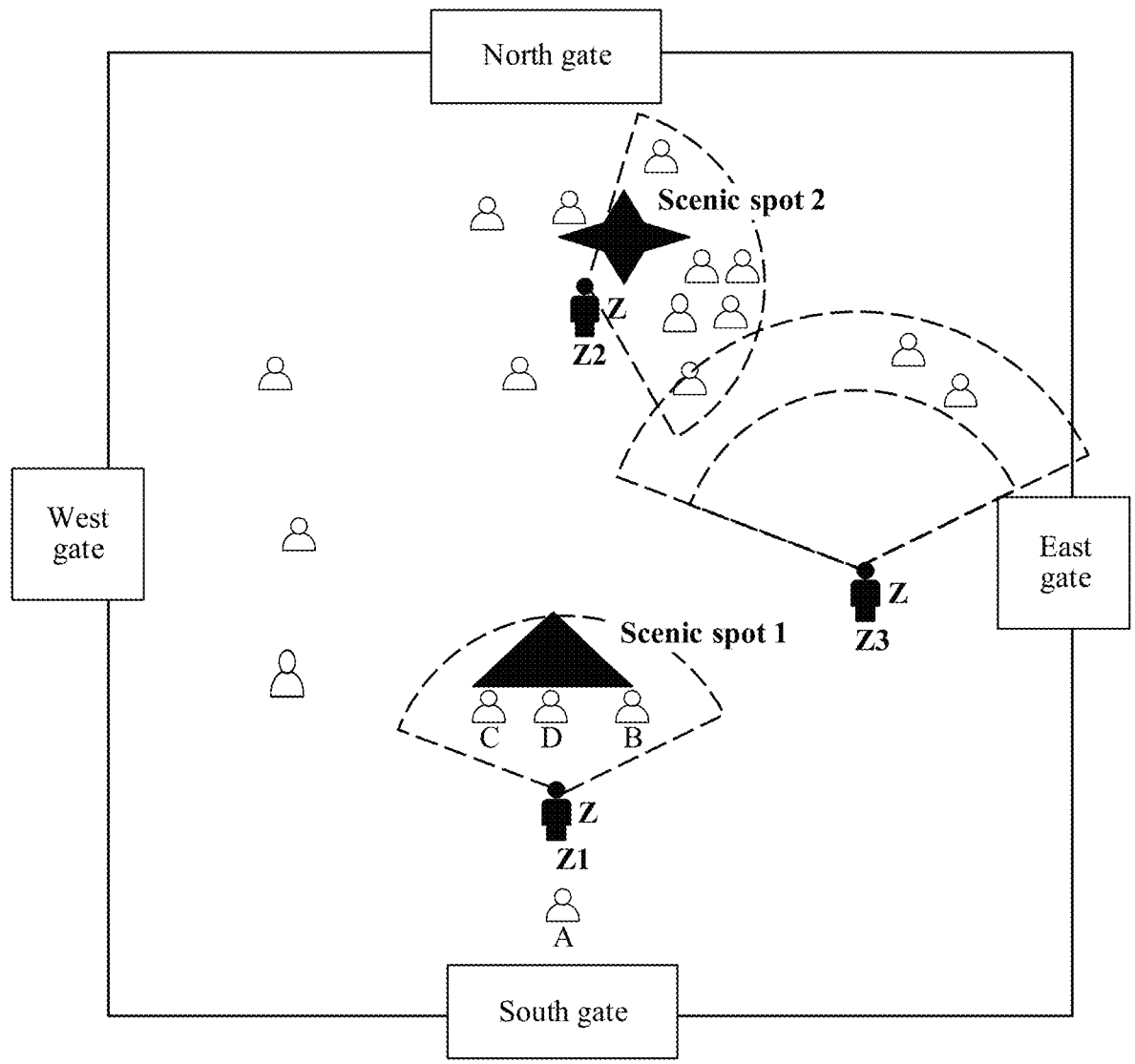
FIG. 8 is a schematic diagram of an environment map according to an embodiment of this application.
Figure 9:
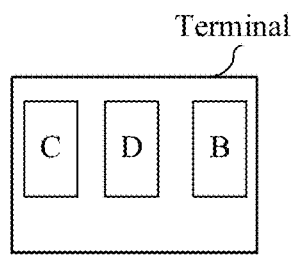
FIG. 9 is a schematic diagram of a display method of a video picture according to an embodiment of this application.

Video scenario 1: As shown in FIG. 8, when the user Z moves to a Z1 position on the map and an included angle between an orientation angle of the user Z and a Y axis is 0°, there are three livestreamers within the sight distance range and the visual angle of the user Z (a range covered by a virtual arc in the figure), namely B, C, and D. In this case, a livestreamer list delivered to the user Z may include the three livestreamers B, C, and D. The user Z may select to automatically view all of the three livestreamers or conversations, or may manually select to view some of the livestreamers or conversations. After receiving videos from the livestreamers, Z may arrange a layout of pictures according to orientations of B, C, and D. As shown in FIG. 9, a livestreaming picture (a C picture in the figure) of the livestreamer C is on the left side of Z, a livestreaming picture of the D is directly in front of Z, and a livestreaming picture of B is on the right side of Z.

Video scenario 2: When the user Z moves to a Z2 position on the map, and an included angle between an orientation angle of Z and a Y axis is 90°, there are six livestreamers within the sight distance range of Z. In this case, a livestreamer list that may be delivered includes all of the six livestreamers. If a service side or the user wants to select more livestreamers (in which the user may be provided with a livestreamer quantity setting function, and the user may configure, for a target application program on a terminal of the user, media data of a maximum quantity of livestreamers that can be accepted at the same time). An optimal livestreamer may also be selected according to the foregoing position range smart recommendation, quality range smart recommendation, attribute range smart recommendation, or a comprehensive quality range, to ensure optimal experience of the user Z. After Z receives videos of the livestreamers transmitted by a media access machine, a target terminal of the user Z may also arrange a layout of pictures according to sight distances and orientations of the livestreamers relative to Z.

Video scenario 3: When the user Z moves to a Z3 position on the map and an include angle between an orientation angle of Z and a Y axis is 0°, there is no livestreamer within the default sight distance range of the user Z. The sight distance range may be expanded. After appropriately expanding the sight distance range, there are two livestreamers within the sight distance range of the user Z. Then, video streams may be provided to the user Z with reference to the processing method of the foregoing video scenario 1.

For application scenarios that include both audio and videos, the audio-based livestreamer list generation method and the video-based livestreamer list generation method described above may be used together. For example, video pictures may be arranged and audio signals may be played according to relative orientations of the livestreamers and the user Z.

From the perspective of the first object, based on the solutions according to some embodiments, the user terminal of the first object may provide the media stream of the at least one livestreamer to the first object according to the relative relationship between the livestreamers and the first object. For example, media streams of some of the livestreamers with correlation relationships with the object satisfying a specific condition (such as livestreamers with distances from the object being smaller than a set value) may be provided to the object. Alternatively, media streams of some or all of the livestreamers may be displayed to the user according to the display methods of the relative orientation information of between each livestreamer and the object. From the perspective of the server, the server may transmit the media streams of some of the livestreamers with correlation relationships with the first object satisfying a specific condition to the user terminal of the first object and display to the object according to the relevant information of the first object and the livestreamers. Alternatively, the server may transmit both media streams of some or all of the livestreamer and the display method prompt information of the media streams to the user terminal of the first object. The terminal displays the received media streams to the first object according to the display method prompt information of the media streams.

In some embodiments of this application, media data received by different users in the same livestreaming room is no longer the same, but media data that is more consistent with the users, so that user experience can be improved. For example, in a large multi-person room with thousands or tens of thousands of people, an optimal livestreamer may be recommend according to audio and video quality of livestreamers, positional relationships between a user and other livestreamers, common interests and hobbies, and the like, to implement a more realistic and immersive Metaverse real-time communication solution. Pictures that users see are no longer indistinguishable, but may be displayed according to mutual position relationships. Sounds that user hear are no longer indistinguishable, and voice positions and directions of livestreamer that the users hear are determined according to specific positional relationships and directions. This solution can realize more realistic and immersive scenarios such as online classes, conferences, games, and livestreaming.

Figure 10:
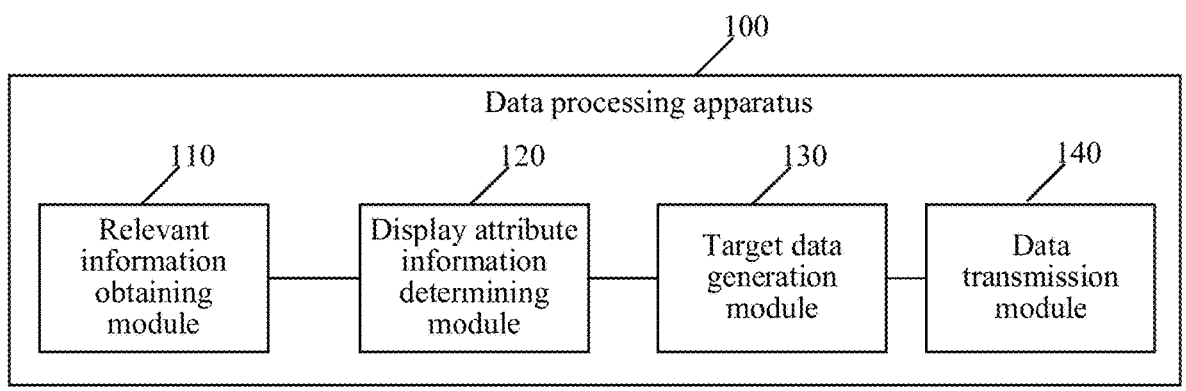
FIG. 10 is a schematic diagram of a structure of a data processing apparatus according to an embodiment of this application.

Based on the same principle of the method according to embodiments of this application, an embodiment of this application further provides a data processing apparatus. As shown in FIG. 10, the data processing apparatus 100 includes a relevant information obtaining module 110, a display attribute information determining module 120, a target data generation module 130, and a data transmission module 140.

The relevant information obtaining module 110 is configured to: obtain relevant information of a first object corresponding to a target application program and relevant information of second objects in a candidate object set. The relevant information includes at least one of position information or object attribute information. The first object and the second objects are objects corresponding to a same streaming media identifier.

The display attribute information determining module 120 is configured to: determine, according to the relevant information of the first object and the relevant information of the second objects, display attribute information corresponding to the second objects. The display attribute information corresponding to one of the second objects is configured for identifying a display attribute of a media stream of the second object corresponding to the first object.

The target data generation module 130 is configured to: generate a target data stream according to the display attribute information corresponding to the second objects. The target data stream includes a media stream of at least one target object. The at least one target object is a second object determined from the second objects.

The data transmission module 140 is configured to: transmit the target data stream to a target terminal corresponding to the first object, to enable the target terminal to display a media stream in the target data stream to the first object.

In some embodiments, the display attribute information includes at least one of first information or second information. The first information is configured for determining whether to provide a media stream of each second object to the first object, and the second information is configured for determining a display method for displaying a media stream to the first object.

In some embodiments, the display attribute information includes the first information. When determining, according to the relevant information of the first object and the relevant information of the second objects, the display attribute information corresponding to the second objects, the display attribute information determining module may be configured to:

determine, for each of the second objects, a correlation degree between the first object and the second object according to the relevant information of the first object and the relevant information of the second object, and use the correlation degree as first information corresponding to the second object.

The target data generation module may be configured to: determine, from the second objects according to the correlation degrees Corresponding to the second objects, the at least one target object matching the first object, and generate the target data stream based on the media stream of the at least one target object.

In some embodiments, the relevant information includes the position information. For each of the second objects, the display attribute information determining module may be configured to:

determine a distance between the first object and the second object according to position information of the first object and position information of the second object, and represent the correlation degree between the first object and the second object by using the distance. The distance is in negative correlation with the correlation degree.

The media stream includes a video stream. The position information includes an orientation and position coordinates of an object. The target data generation module may be configured to:

determine, for each of the second objects, a viewing angle deviation of the second object relative to the first object according to position coordinates of the second object and the position information of the first object; and determine the at least one target object from the second objects according to the distances and the viewing angle deviations corresponding to the second objects.

In some embodiments, the target data generation module may be configured to: determine second objects corresponding to target distances that are in the distances corresponding to the second objects and that are not greater than a preset value as the target objects.

In some embodiments, the target data generation module may be further configured to:

determine, by adjusting the preset value if a quantity of the target distances does not satisfy a preset quantity requirement, target distances satisfying the preset quantity requirement from the distances corresponding to the second objects, and determine second objects corresponding to the target distances as the target objects; and use, if a quantity of the target distances is greater than a set quantity, the second objects corresponding to the target distances as candidate objects, obtain quality of media streams corresponding to the candidate objects, and determine the at least one target object from the candidate objects according to the quality of the media streams corresponding to the candidate objects.

In some embodiments, the target data generation module may be further configured to: obtain quality of media streams of the second objects; and determine the at least one target object from the second objects according to the quality of the media streams of the second objects.

In some embodiments, the relevant information includes the position information, and the display attribute information includes the second information. The display attribute information determining module may be configured to:

determine, for each of the target objects, orientation indication information between the target object and the first object according to the position information of the first object and position information of the target object, and use the orientation indication information as second information corresponding to the target object.

The target data generation module may be configured to: generate the target data stream according to the orientation indication information corresponding to the target objects and the media stream corresponding to the target objects. The target data stream further includes the orientation indication information corresponding to the target objects. The orientation indication information is configured for indicating that the target terminal displays, according to the orientation indication information corresponding to the target objects, the media streams corresponding to the target objects to the first object.

In some embodiments, the target data generation module may be further configured to: determine a total quantity of objects corresponding to a streaming media identifier; and determine a quantity of the target objects according to the total quantity.

In some embodiments, the data transmission module may be further configured to:

transmit, before the generating a target data stream, a target object list to the target terminal to display the target object list to the first object by using the target terminal, the target object list including object identifiers of the target objects; and receive object selection feedback information transmitted by the target terminal for the target object list, the object selection feedback information being generated by the target terminal in response to a selection operation of the first object on the target object list.

The media stream included in the target data stream is a media stream of the at least one target object corresponding to the object selection feedback information.

In some embodiments, position information of any object includes at least one of the following:

real position information of the object; and virtual position information corresponding to the object in a virtual scene of the target application program.

An embodiment of this application further provides a data processing apparatus. In some embodiments, the data processing apparatus may be a user terminal. The data processing apparatus may include:

an obtaining module, configured to: obtain a media data obtaining trigger operation of a first object corresponding to a target application program; and a display module, configured to: display a media stream of at least one target object in second objects in a candidate object set to the first object in response to the media data obtaining trigger operation.

The second objects have corresponding display attribute information. The at least one target object is a second object determined from the second objects. The first object and the second objects are objects corresponding to a same streaming media identifier of the target application program. The media stream of the at least one target object matches display attribute information corresponding to the at least one target object. The display attribute information corresponding to one of the second objects is configured for identifying a display attribute of a media stream of the second object corresponding to the first object. The display attribute information matches relevant information of the first object and relevant information of the second object. The relevant information includes at least one of position information and object attribute information.

In some embodiments, the display attribute information includes at least one of first information or second information. The first information is configured for determining whether to provide a media stream of each second object to the first object, and the second information is configured for determining a display method for displaying a media stream to the first object.

In some embodiments, the display module may be configured to: use second objects located within a visual range of the first object and/or located within an audible distance of the first object as the target objects, and display the media streams of the target objects to the first object.

In some embodiments, the display module may be configured to:

determine relative orientation information between the target objects and the first object according to orientation indication information corresponding to the target objects; and display the media streams of the target objects to the first object according to the relative orientation information corresponding to the target objects.

In some embodiments, the media stream includes an audio stream. The display module may be configured to:

determine, according to the orientation indication information corresponding to the target objects, spatial playback directions of audio streams corresponding to the target objects relative to the first object; and play the audio streams corresponding to the target objects to the first object by using a spatial audio playback method according to the spatial playback directions corresponding to the target objects.

In some embodiments, the media stream includes a video stream. The display module may be configured to:

determine, according to the orientation indication information corresponding to the target objects, video presenting positions of video streams corresponding to the target objects on a user interface of the user terminal; and present, according to the video presenting positions corresponding to the target objects, the video streams corresponding to the target objects to the first object. In some embodiments, the display module may be further configured to: display, in response to that the display attribute information corresponding to the second objects changes, a media stream of at least one target object matching changed display attribute information corresponding to the second objects to the first object.

The apparatus of some embodiments can perform the method according to some embodiments, and the implementation principles of the apparatus and the method are similar. The actions performed by the modules in the apparatus of some embodiments correspond to the steps in the method according to embodiments of this application. For a detailed functional description of the modules of the apparatus, reference may be made in particular to the description of the corresponding method shown in the foregoing description, and details are not described herein again.

An embodiment of this application further provides an electronic device, including a memory, a processor, and a computer program stored in the memory. The processor, when executing the computer program stored in the memory, may implement the method according to an embodiment in this application.

Figure 11:
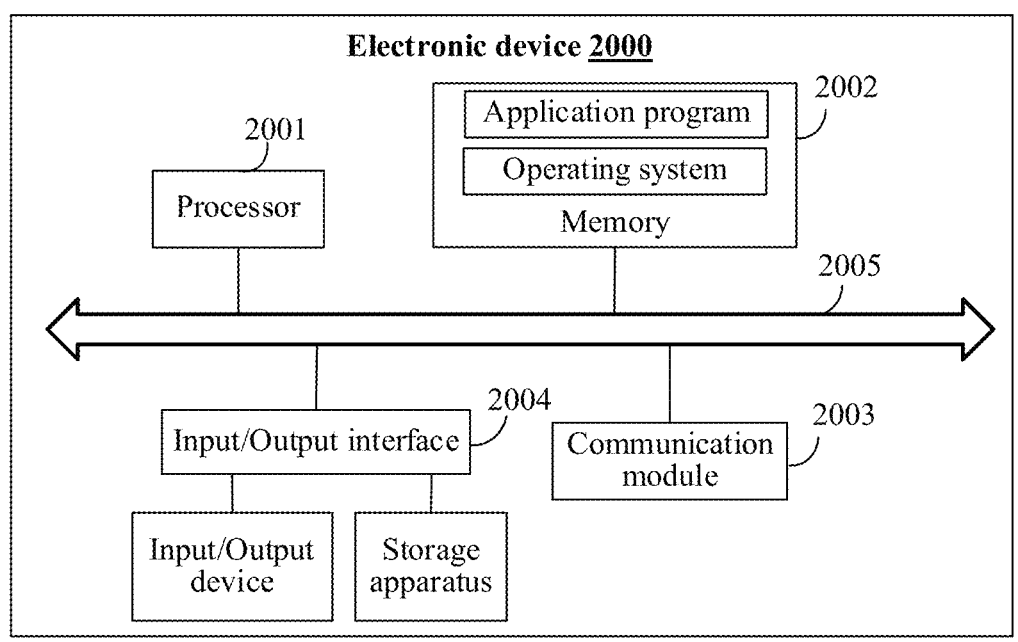
FIG. 11 is a schematic diagram of a structure of an electronic device according to an embodiment of this application.

FIG. 11 is a schematic diagram of a structure of an electronic device applicable to an embodiment of this application. As shown in FIG. 11, the electronic device may be a server or a user terminal. The electronic device may be configured to implement the method according to any embodiment in this application.

As shown in FIG. 11, the electronic device 2000 may mainly include components such as at least one processor 2001 (one is shown in FIG. 11), a memory 2002, a communication module 2003, and an input/output interface 2004. In some embodiments, the components implement connection and communication via a bus 2005. The structure of the electronic device 2000 shown in FIG. 11 is only an example, and do not constitute a limitation on the electronic device to which the method according to embodiments of this application is applied.

The memory 2002 may be configured to store an operating system, an application program, and the like. The application program may include a computer program implementing the method according to embodiments of this application when invoked by the processor 2001, and may alternatively include a program implementing another function or service. The memory 2002 may be a read only memory (ROM) or another type of static storage device that may store static information and instructions, a random access memory (RAM) or another type of dynamic storage device that may store information and a computer program, an electrically erasable programmable read only memory (EEPROM), a compact disc read only memory (CD-ROM), or another optical disc storage, an optical disk storage (including a compact disk, a laser disk, an optical disk, a digital versatile disk, a blue-ray disk, and the like), a magnetic disk storage medium or another magnetic storage device, or any other media that can be used to carry or store expected program code in a form of instructions or data structures and can be accessed by a computer, but is not limited thereto.

The processor 2001 is connected to the memory 2002 via the bus 2005, to implement a corresponding function by invoking the application program stored in the memory 2002. The processor 2001 may be a central processing unit (CPU), a general-purpose processor, a digital signal processor (DSP), an application-specific integrated circuit (ASIC), a field programmable gate array (FPGA), or another programmable logical device, a transistor logical device, a hardware component, or a combination thereof. The processor may implement or perform various examples of logic blocks, modules, and circuits described with reference to content disclosed in this application. Alternatively, the processor 2001 may be a combination for implementing a computing function, for example, a combination including one or more microprocessors, or a combination of the DSP and a microprocessor.

The electronic device 2000 may be connected to a network by using the communication module 2003 (which may include but is not limited to components such as a network interface), to implement data exchange by communication between the network and another device (such as the user terminal or the server), for example, to transmit data to the another device or to receive data from the another device. The communication module 2003 may include a wired network interface, a wireless network interface, and/or the like. That is, the communication module may include at least one of a wired communication module or a wireless communication module.

The electronic device 2000 may be connected to a required input/output device, for example, a keyboard and a display device, via the input/output interface 2004. The electronic device 2000 may have a display device or may be externally connected to another display device via the interface 2004. In some embodiments, a storage apparatus, for example, a hard disk, may alternatively connected to the electronic device via the interface 2004, to store data in the electronic device 2000 in the storage apparatus, to read data in the storage apparatus, or to store data in the storage apparatus in the memory 2002. The input/output interface 2004 may be a wired interface or a wireless interface. According to different specific application scenarios, the device connected to the input/output interface 2004 may be a component of the electronic device 2000 or an externally connected device connected to the electronic device 2000 when needed.

The bus 2005 for connecting the components may include a path for transmitting information between the components. The bus 2005 may be a peripheral component interconnect (PCI) bus, an extended industry standard architecture (EISA) bus, or the like. The bus 2005 may be classified into an address bus, a data bus, a control bus, and the like according to different functions.

In some embodiments, for the solutions according to embodiments of this application, the memory 2002 may be configured to store the computer program performing the solutions of this application and is run by the processor 2001. The processor 2001 runs the computer program to implement the method or action of the apparatus according to embodiments of this application.

Based on the same principle of the method according to embodiments of this application, an embodiment of this application provides a computer-readable storage medium, having a computer program stored thereon. The computer program, when executed by a processor, may implement corresponding contents according to the foregoing method embodiments.

An embodiment of this application further provides a computer program product, having a computer program stored thereon. The computer program, when executed by a processor, may implement corresponding contents according to the foregoing method embodiments.

The terms such as "first", "second", "third", "fourth", "1", and "2" (if any) in the specification and claims of this application and in the foregoing accompanying drawings are used for distinguishing similar objects and not necessarily used for describing any particular order or sequence. Such used data is interchangeable where appropriate, so that embodiments of this application described here can be implemented in an order other than those illustrated or described here.

Although various operation steps are indicated by arrows in the flowcharts of embodiments of this application, the order in which the steps are implemented is not limited to the order indicated by the arrows. In some implementation scenarios of embodiments of this application, the implementation steps in the flowcharts may be performed in other orders according to requirements, unless explicitly stated herein. In addition, some or all of the steps in the flowcharts may include a plurality of sub-steps or a plurality of stages based on specific implementation scenarios. Some or all of these sub-steps or stages may be performed at the same time, and each of the sub-steps or stages may be performed at different time points respectively. The performing order of these sub-steps or stages may be flexibly configured according to requirements in scenarios with different performing time points, which is not limited in embodiments of this application.

The foregoing descriptions are merely implementations of some implementation scenarios of this application. For a person of ordinary skill in the art, other similar implementation measures based on the technical idea of this application are used without departing from the technical concepts of the solutions of this application, which also fall within the protection scope of embodiments of this application.

What is claimed is:

1. A data processing method, performed by a server, the method comprising:
    obtaining relevant information of a first object corresponding to a target application program and relevant information of second objects in a candidate object set, the relevant information comprising at least one of position information or object attribute information, and the first object and the second objects corresponding to a same streaming media identifier;
    determining, according to the relevant information of the first object and the relevant information of the second objects, display attribute information corresponding to the second objects, the display attribute information corresponding to one of the second objects being configured for identifying a display attribute of a media stream of the second object corresponding to the first object;
    generating a target data stream according to the display attribute information corresponding to the second objects, the target data stream comprising a media stream of at least one target object, and the at least one target object being a second object determined from the second objects; and
    transmitting the target data stream to a target terminal corresponding to the first object, to enable the target terminal to display a media stream in the target data stream.

2. The method according to claim 1, wherein the display attribute information comprises at least one of first information or second information, the first information is configured for determining whether to provide a media stream of each second object to the first object, and the second information is configured for determining a display method for displaying a media stream to the first object.

3. The method according to claim 2, wherein the display attribute information comprises the first information;
    the determining, according to the relevant information of the first object and the relevant information of the second objects, display attribute information corresponding to the second objects comprises:
    determining, for each of the second objects, a correlation degree between the first object and the second object according to the relevant information of the first object and the relevant information of the second object, and using the correlation degree as first information corresponding to the second object; and
    the generating a target data stream according to the display attribute information corresponding to the second objects comprises:
    determining, from the second objects according to the correlation degrees Corresponding to the second objects, the at least one target object matching the first object; and generating the target data stream based on the media stream of the at least one target object.

4. The method according to claim 2, wherein the relevant information comprises the position information, and the display attribute information comprises the second information;
the determining, according to the relevant information of the first object and the relevant information of the second objects, display attribute information corresponding to the second objects comprises:
determining, for each of the target objects, orientation indication information between the target object and the first object according to the position information of the first object and position information of the target object, and using the orientation indication information as second information corresponding to the target object; and
the generating a target data stream according to the display attribute information corresponding to the second objects comprises:
generating the target data stream according to the orientation indication information corresponding to the target objects and the media stream corresponding to the target objects, the target data stream further comprising the orientation indication information corresponding to the target objects, the orientation indication information being configured for indicating that the target terminal displays, according to the orientation indication information corresponding to the target objects, the media streams corresponding to the target objects to the first object.

5. The method according to claim 3, wherein the relevant information comprises the position information; and
the determining, for each of the second objects, a correlation degree between the first object and the second object according to the relevant information of the first object and the relevant information of the second object comprises:
determining a distance between the first object and the second object according to position information of the first object and position information of the second object, and representing the correlation degree between the first object and the second object by using the distance, the distance being in negative correlation with the correlation degree.

6. The method according to claim 5, wherein the media stream comprises a video stream, the position information comprises an orientation and position coordinates of an object, and the method further comprises:
determining, for each of the second objects, a viewing angle deviation of the second object relative to the first object according to position coordinates of the second object and the position information of the first object; and
determining the at least one target object from the second objects according to the distances corresponding to the second objects comprises:
determining the at least one target object from the second objects according to the distances and the viewing angle deviations corresponding to the second objects.

7. The method according to claim 5, wherein determining the at least one target object from the second objects according to the distances corresponding to the second objects comprises:
determining distances that are in the distances corresponding to the second objects and that are not greater than a preset value as target distances, and determining second objects corresponding to the target distances as the target objects.

8. The method according to claim 7, wherein the determining distances that are in the distances corresponding to the second objects and that are not greater than a preset value as target distances, and determining second objects corresponding to the target distances as the target objects comprises:
determining, by adjusting the preset value if a quantity of the target distances does not satisfy a preset quantity requirement, target distances satisfying the preset quantity requirement from the distances corresponding to the second objects, and determining second objects corresponding to the target distances as the target objects; and
using, if a quantity of the target distances is greater than a set quantity, the second objects corresponding to the target distances as candidate objects, obtaining quality of media streams corresponding to the candidate objects, and determining the at least one target object from the candidate objects according to the quality of the media streams corresponding to the candidate objects.

9. The method according to claim 1, further comprising:
obtaining quality of media streams of the second objects; and
determining the at least one target object from the second objects according to the quality of the media streams of the second objects.

10. The method according to claim 1, wherein before the generating a target data stream, the method further comprises:
transmitting a target object list to the target terminal to display the target object list by using the target terminal, the target object list comprising object identifiers of the target objects; and
receiving object selection feedback information transmitted by the target terminal for the target object list, the object selection feedback information being generated by the target terminal in response to a selection operation on the target object list,
the media stream comprised in the target data stream being a media stream of the at least one target object corresponding to the object selection feedback information.

11. A data processing method, performed by a user terminal, the method comprising:
displaying, in response to a media data obtaining trigger operation of a first object corresponding to a target application program, a media stream of at least one target object in second objects in a candidate object set to the first object,
the second objects having corresponding display attribute information, the at least one target object being a second object determined from the second objects, the media stream of the at least one target object matching display attribute information corresponding to the at least one target object, the display attribute information corresponding to one of the second objects being configured for identifying a display attribute of a media stream of the second object corresponding to the first object, the display attribute information matching relevant information of the first object and relevant information of the second object, the relevant information comprising at least one of position information and object attribute information, and the first object and the second objects being objects corresponding to a same streaming media identifier of the target application program.

12. The method according to claim 11, wherein the displaying a media stream of at least one target object in second objects in a candidate object set to the first object comprises:
    using second objects located within a visual range of the first object and/or located within an audible distance of the first object as the target objects, and displaying the media streams of the target objects to the first object.

13. The method according to claim 11, wherein the displaying a media stream of at least one target object in second objects in a candidate object set to the first object comprises:
    determining relative orientation information between the target objects and the first object according to orientation indication information between the target objects and the first object; and
    displaying the media streams of the target objects according to the relative orientation information corresponding to the target objects.

14. The method according to claim 13, wherein the media stream comprises an audio stream, and the displaying the media streams of the target objects to the first object according to the relative orientation information corresponding to the target objects comprises:
    determining, according to the relative orientation information corresponding to the target objects, spatial playback directions of audio streams corresponding to the target objects relative to the first object; and
    playing the audio streams corresponding to the target objects by using a spatial audio playback method according to the spatial playback directions corresponding to the target objects.

15. The method according to claim 13, wherein the media stream comprises a video stream, and the displaying the media streams of the target objects to the first object according to the relative orientation information corresponding to the target objects comprises:
    determining, according to the relative orientation information corresponding to the target objects, video presenting positions of video streams corresponding to the target objects on a user interface of the user terminal; and
    presenting, according to the video presenting positions corresponding to the target objects, the video streams corresponding to the target objects to the first object.

16. The method according to claim 11, further comprising:
    displaying, in response to that the display attribute information corresponding to the second objects changes, a media stream of at least one target object matching changed display attribute information corresponding to the second objects to the first object.

17. An electronic device, comprising a memory and a processor, the memory having a computer program stored therein, and the processor executing the computer program to implement a data processing method, performed by a server, the method comprising:
    obtaining relevant information of a first object corresponding to a target application program and relevant information of second objects in a candidate object set, the relevant information comprising at least one of position information or object attribute information, and the first object and the second objects corresponding to a same streaming media identifier;
    determining, according to the relevant information of the first object and the relevant information of the second objects, display attribute information corresponding to the second objects, the display attribute information corresponding to one of the second objects being configured for identifying a display attribute of a media stream of the second object corresponding to the first object;
    generating a target data stream according to the display attribute information corresponding to the second objects, the target data stream comprising a media stream of at least one target object, and the at least one target object being a second object determined from the second objects; and
    transmitting the target data stream to a target terminal corresponding to the first object, to enable the target terminal to display a media stream in the target data stream.

18. The electronic device according to claim 17, wherein the display attribute information comprises at least one of first information or second information, the first information is configured for determining whether to provide a media stream of each second object to the first object, and the second information is configured for determining a display method for displaying a media stream to the first object.

19. The electronic device according to claim 18, wherein the display attribute information comprises the first information;
    the determining, according to the relevant information of the first object and the relevant information of the second objects, display attribute information corresponding to the second objects comprises:
    determining, for each of the second objects, a correlation degree between the first object and the second object according to the relevant information of the first object and the relevant information of the second object, and using the correlation degree as first information corresponding to the second object; and
    the generating a target data stream according to the display attribute information corresponding to the second objects comprises:
    determining, from the second objects according to the correlation degrees corresponding to the second objects, the at least one target object matching the first object; and
    generating the target data stream based on the media stream of the at least one target object.

20. The electronic device according to claim 19, wherein the relevant information comprises the position information; and
    the determining, for each of the second objects, a correlation degree between the first object and the second object according to the relevant information of the first object and the relevant information of the second object comprises:
    determining a distance between the first object and the second object according to position information of the first object and position information of the second object, and representing the correlation degree between the first object and the second object by using the distance, the distance being in negative correlation with the correlation degree.

* * * * *